United States Patent
Ozturk

(10) Patent No.: US 9,140,341 B2
(45) Date of Patent: Sep. 22, 2015

(54) GEAR DEVICE, PREFERABLY MOTOR DEVICE

(75) Inventor: Mustafa Naci Ozturk, Istanbul (TR)

(73) Assignee: Erke Erke Arastirmalari ve Muhendislik A.S., Istanbul (TR)

( * ) Notice: Subject to any disclaimer, the term of this patent is extended or adjusted under 35 U.S.C. 154(b) by 707 days.

(21) Appl. No.: 12/988,313

(22) PCT Filed: Apr. 17, 2008

(86) PCT No.: PCT/EP2008/003028
§ 371 (c)(1),
(2), (4) Date: Oct. 16, 2010

(87) PCT Pub. No.: WO2009/127228
PCT Pub. Date: Oct. 22, 2009

(65) Prior Publication Data
US 2011/0041628 A1    Feb. 24, 2011

(51) Int. Cl.
*G01C 19/30* (2006.01)
*F16H 33/10* (2006.01)

(52) U.S. Cl.
CPC ............. *F16H 33/10* (2013.01); *Y10T 74/1254* (2015.01)

(58) Field of Classification Search
CPC ................................ F16H 33/10; Y10T 74/12
USPC ........................................ 74/5.2, 5.4, 5.8, 5.9
See application file for complete search history.

(56) References Cited

U.S. PATENT DOCUMENTS

| | | | | |
|---|---|---|---|---|
| 1,150,311 A | * | 8/1915 | Sperry | 74/5.22 |
| 2,389,826 A | * | 11/1945 | Stalker | 475/268 |
| 2,589,874 A | * | 3/1952 | Seliger | 74/5.47 |
| 2,817,975 A | * | 12/1957 | Granqvist | 74/5.47 |
| 2,947,177 A | * | 8/1960 | Read | 74/5.6 C |
| 3,077,787 A | * | 2/1963 | Majendie et al. | 74/5.47 |
| 3,161,066 A | * | 12/1964 | Ten Bosch et al. | 74/5.47 |
| 3,318,161 A | * | 5/1967 | Barkalow et al. | 74/5.34 |
| 3,587,330 A | * | 6/1971 | Deer | 74/5.6 R |
| 3,741,500 A | * | 6/1973 | Liden | 244/165 |
| 4,498,015 A | * | 2/1985 | Gottfried | 290/15 |
| 4,723,735 A | * | 2/1988 | Eisenhaure et al. | 244/165 |

(Continued)

FOREIGN PATENT DOCUMENTS

DE    4337858 A1    5/1995
WO    2005/000623 A    1/2005

*Primary Examiner* — William Kelleher
*Assistant Examiner* — Zakaria Elahmadi
(74) *Attorney, Agent, or Firm* — Venjuris, P.C.

(57) ABSTRACT

A gyroscopic device is described for providing rotation about at least one output axis and a method for providing rotation. A body (2) is mounted for a rotation about first (4), second (11), and third (16) axes. The first axis (4) is oriented with respect to the second axis (11) at an inclination angle. The second axis (11) and/or the third axis (16) constitute the at least one output axis of device. The rotation of the body (2) about the third axis (16) gives rise to a change in the inclination angle. A ram (15) applies a torque (21) to the body (2) about the third axis (16) in a sense of increasing inclination angle when the first axis (4) is at a selected inclination angle with respect to the second axis (11) which is greater than 0° and less than 90°. The rotation of the body (2) about the third axis (16) in a sense of decreasing inclination angle is limited such that the inclination angle of the first axis (4) with respect to the second axis (11) remains greater than 0 degrees and less than 90 degrees. The body (2) is rotated about the first axis (4) at an angular velocity greater than a critical angular velocity so that a constant or a decreasing inclination angle is reached.

35 Claims, 11 Drawing Sheets

(56) References Cited

U.S. PATENT DOCUMENTS

| | | | | |
|---|---|---|---|---|
| 5,386,738 A * | 2/1995 | Havenhill | | 74/5.22 |
| 5,628,267 A * | 5/1997 | Hoshio et al. | | 114/122 |
| 6,571,652 B2 * | 6/2003 | Adcock | | 74/5.9 |
| 6,729,197 B2 * | 5/2004 | Adcock | | 74/5.9 |
| 6,789,437 B2 * | 9/2004 | Wyse | | 74/5.4 |
| 6,860,166 B2 * | 3/2005 | Hintz | | 74/5.47 |
| 6,973,847 B2 * | 12/2005 | Adams et al. | | 74/5.47 |
| 7,451,667 B2 * | 11/2008 | Hamady | | 74/5.12 |
| 8,020,809 B2 * | 9/2011 | Peck et al. | | 244/165 |
| 8,047,090 B2 * | 11/2011 | Ozturk | | 74/5.47 |
| 8,297,138 B2 * | 10/2012 | Harrison | | 74/5.37 |
| 2002/0145077 A1 * | 10/2002 | Shultz | | 244/79 |
| 2003/0159532 A1 | 8/2003 | Adcock | | |
| 2003/0234318 A1 * | 12/2003 | Neff | | 244/62 |
| 2004/0118231 A1 * | 6/2004 | Peck | | 74/5.4 |
| 2006/0248968 A1 * | 11/2006 | Ledsome | | 74/5 R |

* cited by examiner

GEAR DEVICE, PREFERABLY MOTOR DEVICE

The present invention relates to a gear device, preferably a motor device, and more specifically to a gear device, preferably motor device, which can supply output rotational power about at least one output axis in response to input rotational power about a different axis. Furthermore, the present invention relates to a method of providing a rotation and to a test device for determination of parameters for design and operation of such a gear device, preferably motor device, and a corresponding method.

When a rotating body is acted on by a torque about an axis perpendicular to the axis of rotation, this causes the axis of rotation itself to rotate about a further axis which is perpendicular to both the axis of the applied torque and the axis of rotation. This principle is well known in gyroscopic devices. The effect is named precession.

It is the object of the present invention to provide an improved gear device, preferably motor device (i.e. a gyroscopic device) which makes use of the aforementioned principle, and a corresponding method for providing rotation by means of said gear device, preferably motor device.

This object is solved by the invention through different ways which are formulated in the patent claims and which are described in the following.

The ways 1 to 4 and way 15 concern device solutions which are formed as gear device, preferably motor devices. The ways 5 to 12 and way 16 concern method solutions which are formed as methods for providing rotation. The way 13 concerns a device solution which is formed as a test device for determination of parameters for design and operation of a gear device, preferably motor device according to the invention. The way 14 concerns a method solution which is formed as a method for determination of parameters for designing and operation of a gear device, preferably motor device according to the invention.

The different ways 1 to 16 are given in the patent claims. The main claims are structured in a preamble and a characterising part. This structure is for a better understanding of the subject-matter of the claims. The distribution of the features into the preamble and the characterising part does not mean that all features of the preamble are known and all the features of the characterising part are novel, or vice versa. The value of the features of the claims is independent of whether they are in preamble or in the characterising part.

The solution according to way 1 is achieved by providing a gear device, preferably motor device for providing rotation about at least one output axis, the gear device, preferably motor device comprising a body mounted for a rotation about a first axis and a rotation about a second axis and a rotation about a third axis, the first axis being oriented with respect to the second axis at an inclination angle, the second axis and/or the third axis constituting the at least one output axis of the gear device, preferably motor device, wherein the rotation of the body about the third axis gives rise to a change in the inclination angle, means for applying a torque to the body about the third axis in the direction of increasing inclination angle when the first axis is at a selected inclination angle with respect to the second axis which is greater than 0 degrees and less than 90 degrees, and means for limiting the rotation of the body about the third axis in a direction of decreasing inclination angle such that the inclination angle of the first axis with respect to the second axis remains greater than 0 degrees and less than 90 degrees, the gear device being so structured as to enable a source of motive power to be connected to the body to cause the body to rotate about the first axis, and whereby the rotation of the body about the first axis is at an angular velocity greater than a critical angular velocity so that a constant or a decreasing inclination angle is reached, thereby to initiate or increase an output angular velocity and/or an output torque of the rotation of the body about the second axis and/or about the third axis as said at least one output axis, whereby the body has a specific critical angular velocity of less than 20000 rounds per minute, preferably thereby to increase an output power about the at least one output axis, whereby said specific critical angular velocity is defined as follows: the specific critical angular velocity is the critical angular velocity of the body when the inclination angle of the first axis with respect to the second axis is 45 degrees, when the first axis passes through substantially the center of mass of the body, when the body is oriented such that the moment of inertia of the body is substantially maximized, when, if the body is not symmetrical about a plane which passes through the center of mass of the body and which is orthogonal to the first axis, among the possible mounting orientations of mounting the body on the first axis the one is chosen that results in a smaller distance between the center of mass of the body and the third axis, and when a connection arm length is a) 5 mm if the mass of the body is less than 0.1 kg, b) 25 mm if the mass of the body is equal to or greater than 0.1 kg and less than 100 kg, c) 50 mm if the mass of the body is equal to or greater than 100 kg and less than 1000 kg, and d) 100 mm if the mass of the body is equal to or greater than 1000 kg, whereby said connection arm length is the distance of the intersection point of a connection plane and the first axis to the third axis, whereby said connection plane is a plane which is orthogonal to the first axis and intersects the body and has the minimum distance to the inclination axis.

The solution according to way 2 is achieved by providing a gear device, preferably motor device for providing rotation about at least one output axis, the gear device, preferably motor device comprising a body mounted for a rotation about a first axis and a rotation about a second axis and a rotation about a third axis, the first axis being oriented with respect to the second axis at an inclination angle, the second axis and/or the third axis constituting the at least one output axis of the gear device, preferably motor device, wherein the rotation of the body about the third axis gives rise to a change in the inclination angle, means for applying a torque to the body about the third axis in a direction of increasing inclination angle when the first axis is at a selected inclination angle with respect to the second axis which is greater than 0 degrees and less than 90 degrees, and means for limiting the rotation of the body about the third axis in the direction of decreasing inclination angle such that the inclination angle of the first axis with respect to the second axis remains greater than 0 degrees and less than 90 degrees, the gear device being so structured as to enable a source of motive power to be connected to the body to cause the body to rotate about the first axis, and whereby the rotation of the body about the first axis is at an angular velocity greater than a critical angular velocity so that a constant or a decreasing inclination angle is reached, thereby to initiate or increase an output angular velocity and/or an output torque of the rotation of the body about the second axis and/or about the third axis as said at least one output axis, whereby an angle between the vector of the torque applied to the body about the third axis and the vector of the output angular velocity about the second axis is between 85 degrees and 93 degrees, preferably close to 90 degrees.

If the angle between the vector of the torque applied to the body about the third axis and the vector of the output angular velocity about the second axis is between 85 degrees and 93 degrees, preferably close to 90 degrees, an output power supplied about the at least one output axis is increased. When the angle between the vector of the torque applied to the body about the third axis (=applied torque vector) and the output motion vector is higher than 90 degrees, even if the inclination angle is constant, the rotation of the body about the third axis in the direction of decreasing the inclination angle cannot be stopped completely and therefore the output torque decreases.

The solution according to way 3 is achieved by providing a gear device, preferably motor device for providing rotation about at least one output axis, the gear device, preferably motor device comprising a body mounted for a rotation about a first axis and a rotation about a second axis and a rotation about a third axis, the first axis being oriented with respect to the second axis at an inclination angle, the second axis and/or the third axis constituting the at least one output axis of the gear device, preferably motor device, wherein the rotation of the body about the third axis gives rise to a change in the inclination angle, means for applying a torque to the body about the third axis in a direction of increasing inclination angle when the first axis is at a selected inclination angle with respect to the second axis which is greater than 0 degrees and less than 90 degrees, and means for limiting the rotation of the body about the third axis in a direction of decreasing inclination angle such that the inclination angle of the first axis with respect to the second axis remains greater than 0 degrees and less than 90 degrees, the gear device being so structured as to enable a source of motive power to be connected to the body to cause the body to rotate about the first axis, and whereby the rotation of the body about the first axis is at an angular velocity greater than a critical angular velocity so that a constant or a decreasing inclination angle is reached, thereby to initiate or increase an output angular velocity and/or an output torque of the rotation of the body about the second axis and/or about the third axis as said at least one output axis, further comprising one or more sensors for measuring values of one or more of the following parameters: the rotation about the first axis and/or the second axis and/or the third axis, the angular velocity of the rotation about the first axis and/or the second axis and/or the third axis, the position of the body and/or the first axis and/or the second axis and/or the third axis, the torque of the rotation about the first axis and/or the second axis and/or the third axis, a force.

The solution according to way 4 is achieved by providing a gear device, preferably motor device for providing rotation about at least one output axis, the gear device, preferably motor device comprising a body mounted for a rotation about a first axis and a rotation about a second axis and a rotation about a third axis, the first axis being oriented with respect to the second axis at an inclination angle, the second axis and/or the third axis constituting the at least one output axis of the gear device, preferably motor device, wherein the rotation of the body about the third axis gives rise to a change in the inclination angle, means for applying a torque to the body about the third axis in a direction of increasing inclination angle when the first axis is at a selected inclination angle with respect to the second axis which is greater than 0 degrees and less than 90 degrees, and means for limiting the rotation of the body about the third axis in a direction of decreasing inclination angle such that the inclination angle of the first axis with respect to the second axis remains greater than 0 degrees and less than 90 degrees, the gear device being so structured as to enable a source of motive power to be connected to the body to cause the body to rotate about the first axis, and whereby the rotation of the body about the first axis is at an angular velocity greater than a critical angular velocity so that a constant or a decreasing inclination angle is reached, thereby to initiate or increase an output angular velocity and/or an output torque of the rotation of the body about the second axis and/or about the third axis as said at least one output axis, further comprising means for mechanically limiting the rotation of the body about the inclination axis in both directions between a lower limit angle value and an upper limit angle value and means for adjusting these limit angle values during the operation of the gear device, preferably motor device to a chosen lower limit angle value higher than 0 degrees and lower than 90 degrees and an upper limit angle value higher than the chosen lower limit angle value and lower than 90 degrees.

The solution according to way 5 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis whereby the method further comprises using a body with a specific critical angular velocity of less than 20000 rounds per minute, preferably thereby to increase an output power about the at least one output axis, whereby said specific critical angular velocity is defined as follows: the specific critical angular velocity is the critical angular velocity of the body when the inclination angle of the first axis with respect to the second axis is 45 degrees, when the first axis passes through substantially the center of mass of the body, when the body is oriented such that the moment of inertia of the body is substantially maximized, when, if the body is not symmetrical about a plane which passes through the center of mass of the body and which is orthogonal to the first axis, among the possible mounting orientations of mounting the body on the first axis the one is chosen that results in a smaller distance between the center of mass of the body and the third axis, and when a connection arm length is a) 5 mm if the mass of the body is less than 0.1 kg, b) 25 mm if the mass of the body is equal to or greater than 0.1 kg and less than 100 kg, c) 50 mm if the mass of the body is equal to or greater than 100 kg and less than 1000 kg, and d) 100 mm if the mass of the body is equal to or greater than 1000 kg, whereby said connection arm length is the distance of the intersection point of a connection plane and the first axis to the third axis, whereby said connection plane is a plane which is orthogonal to the first axis and intersects the body and has the minimum distance to the inclination axis.

The solution according to way 6 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis whereby the method further comprises applying the torque to the body about the third axis at least partly by means of the weight of the body.

The solution according to way 7 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis whereby the method further comprises measuring values of one or more of the following parameters: the rotation about the first axis and/or the second axis and/or the third axis, the angular velocity of the rotation about the first axis and/or the second axis and/or the third axis, the position of the body and/or the first axis and/or the second axis and/or the third axis, the torque of the rotation about the first axis and/or the second axis and/or the third axis, a force.

The solution according to way 8 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis, whereby the method further comprises mechanically limiting the rotation of the body about the inclination axis in both directions between a lower limit angle value and an upper limit angle value and adjusting, while providing rotation during operation of the gear device, preferably motor device, these limit angle values to a chosen lower limit angle value higher than 0 degrees and lower than 90 degrees and an upper limit angle value higher than the chosen lower limit angle value and lower than 90 degrees.

The solution according to way 9 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis, whereby the method further comprises increasing an output power supplied about the at least one output axis by means of decreasing a distance between the center of mass of the body and the second axis.

The solution according to way 10 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis, whereby the method further comprises increasing an output power supplied about the at least one output axis by means of decreasing a variation of an angle between a normal vector of a first frame plane and a normal vector of a second frame plane, the frame plane defined as a plane which passes through three non-linear points of a frame where the gear device, preferably motor device is mounted in.

The solution according to way 11 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis, whereby the method further comprises increasing an output power supplied about the at least one output axis by means of decreasing a variation of an angle between a vector of the output angular velocity about the at least one output axis and a normal vector of a frame plane, the frame plane defined as a plane which passes through three non-linear points of a frame where the gear device, preferably motor device is mounted in.

The solution according to way 12 is achieved by providing a method of providing rotation about at least one output axis, preferably about at least one output axis of a gear device, preferably motor device, the method comprising: mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle; rotating the body about the first axis at an angular velocity greater than a critical angular velocity; applying a torque to the body about the third axis in a direction of increasing inclination angle when the first axis is at a selected inclination angle with respect to the second axis which is greater than 0 degrees and less than 90 degrees; and limiting the rotation of the body about the third axis in a direction of decreasing inclination angle such that the inclination angle of the first axis with respect to the second axis remains greater than 0 degrees and less than 90 degrees, so that a constant or a decreasing inclination angle is reached, thereby to initiate or increase an output angular velocity and/or an output torque of the rotation of the body about the second axis and/or about the third axis as said at least one output axis, whereby the method further comprises increasing an output power supplied about the at least one output axis by means of decreasing a variation of an angle between the angular velocity vector of the angular motion of the body about the first axis and a normal vector of a body plane, the body plane defined as a plane which passes through three non-linear points of the body.

The solution according to way 13 is achieved by providing a test device for determination of parameters for design and operation of a gear device, preferably motor device, whereby the gear device, preferably motor device comprises an output shaft being solidly connected with an outer cradle, a spin axis being a rotational axis of a body which is rotatably arranged in an inner cradle, and an inclination axis perpendicular to the output shaft, whereby the spin axis is rotatable forming an inclination angle between the spin axis and the output shaft, the spin axis is jointly connected with a body, and a torque is applied about the inclination axis, the test device comprising an output axis constituting a longitudinal axis of a vertical output shaft, a spin axis constituting a rotational axis of a body which is supported on the spin axis, an inclination axis which is perpendicular to the output axis and can pivot about the spin axis forming an inclination angle between the spin axis and the output shaft, whereby the body can be eccentrically arranged with regard to the inclination axis whereby a lever arm of a length l>0 is formed.

The solution according to way 14 is achieved by providing a method for determination of parameters for designing and operation of a gear device, preferably motor device, whereby the gear device, preferably motor device comprises an output shaft being solidly connected with an outer cradle, a spin axis being a rotational axis of a body which is rotatably arranged in an inner cradle, and an inclination axis perpendicular to the output shaft, whereby the spin axis is rotatable forming an inclination angle between the spin axis and the output shaft, the spin axis is jointly connected with a body, and a torque is applied about the inclination axis, whereby the test device as in way 13 is used and whereby an angular velocity of the body about the spin axis is adjusted to different values, whereby there is a determination for each of the different values whether the adjusted angular velocity is greater or less than a critical angular velocity by means of measuring the direction of rotation of the spin axis about the inclination axis.

The solution according to way 15 is achieved by providing a gear device, preferably motor device, for providing rotation about at least one output axis, said device comprising a body mounted for a rotation about a first axis and a rotation about a second axis and a rotation about a third axis, the first axis being oriented with respect to the second axis at an inclination angle, the second axis constituting the output axis of said device, wherein the rotation of the body about the third axis gives rise to a change in the inclination angle, means for applying a torque to the body about the third axis in a direction of increasing inclination angle when the first axis is at a selected inclination angle with respect to the second axis which is greater than 0 degrees and less than 90 degrees, and means for limiting the rotation of the body about the third axis in a direction of decreasing inclination angle such that the inclination angle of the first axis with respect to the second axis remains greater than 0 degrees and less than 90 degrees, said device being so structured as to enable a source of motive power to be connected to the body to cause the body to rotate about the first axis, and whereby the rotation of the body about the first axis is at an angular velocity greater than a critical angular velocity so that a constant or a decreasing inclination angle is reached, thereby to initiate or increase an output angular velocity and/or an output torque of the rotation of the body about the second axis, whereby a load applied to the third axis is used as the limiting means when the inclination angle is decreasing so as to extract power about the third axis.

The solution according to way 16 is achieved by providing a method of providing rotation about at least one output axis, the method comprising mounting a body for a rotation about a first axis and a rotation about a second axis and a rotation about a third axis, the first axis being oriented with respect to the second axis at an inclination angle, the second axis and/or the third axis constituting the at least one output axis, wherein the rotation of the body about the third axis gives rise to a change in the inclination angle, rotating the body about the first axis at an angular velocity greater than a critical angular velocity, applying a torque to the body about the third axis in a direction of increasing inclination angle when the first axis is at a selected inclination angle with respect to the second axis which is greater than 0 degrees and less than 90 degrees, and limiting the rotation of the body about the third axis in a direction of decreasing inclination angle such that the inclination angle of the first axis with respect to the second axis remains greater than 0 degrees and less than 90 degrees, thereby to initiate or increase an output angular velocity and/or an output torque of the rotation of the body about the second axis, wherein the method further comprises extracting power about the third axis by limiting the rotation of the body about the third axis in the direction of decreasing inclination angle when the inclination angle is decreasing.

Concerning the ways 15 and 16, the following can be said: When the device is at stable operating state (also known as the regime state), it is provided that the power is generated about the third axis by limiting the rotation of the body about the third axis using an output load. While power is generated about the third axis, the body rotates about the third axis in the direction of decreasing the inclination angle. This method only can be used when the inclination angle is between 0 degrees and 90 degrees. For the continuity of this method, there should be two different periods. The first period: power is generated about the third axis by limiting the rotation of the body about the third axis using an output load. The second period: the inclination angle is increased by limiting the rotation of the body about the second axis using an output load or a brake mechanism. By repeating these periods consecutively in a loop (period 1, period 2, period 1, period 2, . . . ), the continuity of the generating power from the device is provided. When a brake mechanism is used for limiting the rotation of the body about the second axis, power is only generated about the third axis. When an output load is used instead of the brake mechanism for limiting the rotation of the body about the second axis, power is generated about both the second axis and the third axis. For instance, when a pneumatic pump that is located between the output shaft and the inner cradle is used in order to limit the rotation of the body about the third axis, the first period is defined as the piston of the pump is compressed because of the rotation of the body about the third axis in the direction of decreasing the inclination angle. In the first period, the pressurised air is transferred to a turbine. So power is generated by rotating the turbine. The second period is defined as the piston of the pump is decompressed by limiting the rotation of the body about the second axis using a brake mechanism or any rotational output load such as a hydraulic pump. In this period, air enters to the piston of the pump from outside. This period is also considered as the intake period of the pump.

The gear device, preferably motor device may be used as a gear device and/or a motor device. In this context, the term "motor" must not be understood as a motor which converts non-mechanical energy to mechanical energy, such as a gasoline motor or an electric motor. Here, the term "motor" is rather to be understood as a motor that converts mechanical energy to mechanical energy, similar to a hydraulic motor. When referring in this text to a gear device, this term is to be understood as comprising a gear device, preferably motor device.

The inventors of the present invention have found that, when the axis of rotation of the body (also referred to below as first axis or spin axis) is constrained to rotate about
(a) a second axis which is at an acute angle (also referred to below as inclination angle) to the axis of rotation of the body, and
(b) a third axis (also referred to below as the inclination axis) which is substantially perpendicular to both the first and second axes, the application of a torque about the inclination axis in the direction so as to increase the acute angle causes the first axis to rotate about the second axis.

When the speed of rotation of the body exceeds a certain critical value, this applied torque gives rise to a reaction torque of a magnitude greater than that of the applied torque and which is also directed about the inclination axis, but in the opposite direction. This reaction torque causes the first axis to rotate about the inclination axis in the direction so as to decrease the inclination angle. However, if this rotation about the inclination axis is limited, e.g. by mechanical means, then the speed of rotation of the body about the second axis is increased, thus giving rise to a useful source of motive power. It will be appreciated that, with such a system, the means which are used to limit the rotation about the inclination axis do not require a source of energy, thus enhancing the efficiency of the gear device.

In order to understand these effects, it is useful to consider the following cases (i) to (iv) when the body is caused to rotate at different angular velocities about the first axis:

(i) In the trivial situation in which the body does not rotate at all about the first axis, the application of a torque about the inclination axis in the direction so as to increase the magnitude of the acute angle gives rise merely to a corresponding rotation of the first axis about the inclination axis in the direction so as to increase the inclination angle.

(ii) If the body is caused to rotate at an angular velocity (=rotational speed) which is less than a critical angular velocity (=critical rotational speed), there are two resulting rotations of the first axis: not only is there a rotation of the first axis about the inclination axis in the direction so as to increase the inclination angle, as with the case (i) of a non-rotating body, but there is also a rotation of the first axis about the second axis. This effect is known as precession. As the rotational speed of the body increases, the speed of rotation of the first axis about the inclination axis decreases, whereas the speed of rotation of the first axis about the second axis increases.

(iii) When the rotational speed of the body is equal to the critical angular velocity, there is still the rotation of the first axis about the second axis, but there is now no longer any rotation of the first axis about the inclination axis.

(iv) If the body is caused to rotate at an angular velocity above the critical angular velocity, there are again two rotations of the first axis, i.e. about both the second axis and the inclination axis, but in this case the rotation about the inclination axis is in the direction so as to decrease the inclination angle. It is only when the rotational speed of the body is above the critical angular velocity that the gear device is able to provide useful rotational (=motive) power about the second axis and/or the inclination axis, either or both of which can serve as an output axis of the gear device.

If the body is caused to rotate about the first axis at an angular velocity above the critical angular velocity, the gear device provides an output motion (=rotation) about the second axis and/or an output motion (=rotation) about the third axis. Each of the two rotations may be characterised by a respective angular velocity and a respective torque. In case the body is caused to rotate about the first axis at an angular velocity above the critical angular velocity, the rotation of the body about the third axis in the direction of decreasing inclination angle is also referred to as reaction motion. The angular velocity of the reaction motion is also referred to as reaction speed. The torque of the reaction motion is also referred to as reaction torque.

The critical angular velocity of the body has been found to vary in dependence on the geometry of the body, the density of the material of the body, the inclination angle, the magnitude of the torque applied to the body about the third axis, and environmental conditions such as ambient temperature and humidity.

The inventors have found experimentally that the input motive power supplied to the body to cause it to rotate is used to generate output motive power in the form of the rotation of the body about this output axis with extremely high efficiency. As a consequence, a gear device built according to this principle would be of particular utility. The at least one output axis is the second axis and/or the third axis.

The inventors have found that, with such an arrangement, the efficiency of the gear device is extremely high. Furthermore, the torque applying means conveniently acts as a switch which triggers the provision of the output motive power.

The limiting means is arranged to prevent any rotation of the body about the third axis in the direction of decreasing inclination angle. As mentioned above, since the rotation limiting means is not required to move, it can be constituted by a purely mechanical means, e.g., a stop, which does not require a source of energy, thereby contributing to the high efficiency of the gear device.

A source of motive power may be connected to the body so as to cause it to rotate about the first axis at a rotational speed in excess of the critical angular velocity. Alternatively, the rotation of the body about the spin axis could be generated manually.

When a torque is applied to the body about the third axis so as to increase the inclination angle, a force field occurs on the body itself. For instance, for a cylindrical body of a thickness dx, the shape of the force field is the same as the force field occurring on a circular cross-section of a rod that is forced to bend. This force field, combined with the rotation of the body about the first axis, constitutes the output motion. The transmission efficiency is defined as the efficiency of transmitting the motion constituted by the force field to the output motion about the second axis. Increasing the transmission efficiency increases the output torque, i.e., the torque provided about the output axis, and enhances the efficiency of the gear device. The transmission efficiency depends on both the strength of the materials of the parts of the gear device on which the variable forces (forces whose relative direction to the part varies) act and the strength through the shape of these parts.

If the body rotates about the third axis, this gives rise to a change in the inclination angle. That means that the inclination angle changes, i.e., the inclination angle increases or decreases.

The connection arm length is defined as the distance of the intersection point of the connection plane and the first axis to the third axis, preferably to the center of the pivot where the first axis is pivot-mounted about the second axis. There are infinitely many planes which intersect the body and are orthogonal to the spin axis. Among these planes the one which has the minimum distance to the third axis, preferably the center of pivot, is defined as the connection plane.

In order to measure the specific critical speed of a body, the body must be mounted to the test device according to way 13 such that
a) the spin axis passes through the center of mass of the body,
b) the spin axis is oriented such that the moment of inertia is maximized, and
c) if the body is not symmetrical about the central plane (the plane which passes through the center of mass of the body and is orthogonal to the first axis), among two possible mounting orientations the one with a smaller distance between the center of mass of the body and the third axis, preferably the center of pivot, should be used.

Further advantages of the ways 1 to 14 are achieved by the embodiments of the inventions indicated by the dependent claims.

Concerning the ways 1 and 5, an alternative way of determining the specific critical angular velocity is provided when the inclination angle of the first axis with respect to the second axis is 80 degrees instead of 45 degrees. If the frictional forces acting against the rotation about the spin axis 4 are high, this 80°-arrangement helps increasing and checking/verifying, respectively, the accuracy of the measurement of the specific critical angular velocity by reducing the transmission rate of the torque of the spin axis to the second axis caused by the frictional forces acting against the rotation about the spin axis.

A preferred embodiment of ways 1 and 5 is provided if the body has a specific critical angular velocity of less than 15000 rounds per minute. Another preferred embodiment of ways 1 and 5 is provided if the body has a specific critical angular velocity of less than 10000 rounds per minute. Still another preferred embodiment of ways 1 and 5 is provided if the body has a specific critical angular velocity of less than 5000 rounds per minute. All the aforementioned ranges of the specific critical angular velocity can be realised in combination with all claims.

Since it is mandatory that the spin speed of the body is higher than the critical speed of the body during the operation of the gear device, a body with a higher specific critical value must be rotated at higher speeds compared to a body with a lower specific critical speed. Rotating a body at a lower spin speed value is beneficial because, as is known, the frictional losses (such as air friction, bearing friction) increase exponentially with the spin speed. Furthermore, higher spin speeds in the gear device, preferably motor device require that the overall strength of the motor should be made higher, and this would increase the production costs of the gear device, preferably motor device.

For cylindrical shaped bodies with a same density, the specific critical angular speed of a body increases as the ratio of the diameter of the body to the thickness (=height of cylinder) of the body decreases.

For two different bodies with the same mass, the same thickness (=height) and the same density but with different shapes, namely one is cylindrical, the other one is ring shaped, the one with the ring shape has the lower critical angular speed.

A body with high mass and high volume may not have a high specific critical angular speed. That means that there is no necessary positive correlation between the parameter "specific critical angular speed of a body" and the parameter "mass and volume of the body".

A preferred embodiment of ways 1 to 4 is provided if the gear device comprises a source of motive power which is connected to the body to cause the body to rotate about the first axis at said angular velocity greater than said critical angular velocity.

A preferred embodiment of ways 1 to 4 is provided if the gear device comprises feedback means for transmitting motive power from the motion of the body about the at least one output axis to the source of motive power. In this way, it is possible to feed back at least a portion of the output power, defined as the product of the output torque and the output rotational speed, into the gear device. The feedback means is preferably arranged to transmit sufficient motive power to the source of motive power to overcome energy losses arising from friction due to the rotation of the body about the first axis at the stable operating state. The stable operating state is defined to be the state when the inclination angle is constant and the magnitude of the applied torque about the third axis is constant and the output angular velocity about the at least one output axis is constant.

A preferred embodiment of ways 1 to 4 is provided if the gear device comprises means for controlling the source of motive power so as to cause the body to rotate about the first axis at said rotational speed in excess of the critical angular velocity.

A preferred embodiment of ways 1 to 4 is provided if the torque applying means is arranged to apply the torque when the selected inclination angle is within a range of 10 degrees to 80 degrees.

The means for applying a torque may comprise a spring. Additionally or alternatively, the means for applying a torque may comprise one or more of: a hydraulic ram; a pneumatic ram; an electromagnetic ram.

A preferred embodiment of ways 1 to 4 is provided if the gear device comprises means for controlling the magnitude of the torque applied by the torque applying means.

A preferred embodiment of ways 1 to 4 is provided if the limiting means is arranged to limit the rotation of the body about the third axis such that the inclination angle of the first axis with respect to the second axis is greater than 10 degrees and less than 80 degrees.

It has been found that there is an optimum inclination angle which depends on various factors including a desired output torque of the gear device and a desired output angular velocity of the gear device. For instance, when the inclination angle is close to 0 degrees, the output torque of the second axis is at a minimum but the rotational speed of the second axis is at a maximum. Conversely, when the inclination angle is close to 90 degrees, the output torque of the second axis is at a maximum, but the rotational speed of the second axis at a minimum. Since the output power of the gear device is the product of the output torque and the output rotational speed, it follows that, in order to maximize the output power, it will be necessary to select an inclination angle for which the product of the output torque and the output rotational speed is maximized.

Thus, a preferred embodiment of ways 1 to 4 is provided if the gear device further comprises adjusting means for adjusting the inclination angle. In this case, also means may be provided for selecting a desired output speed and/or desired output torque of the gear device and adjusting the inclination angle accordingly.

A preferred embodiment of ways 1 to 4 is provided if the gear device comprises means for selecting a desired output angular velocity of the gear device and causing the adjusting means to adjust the inclination angle in dependence on the selected output angular velocity.

A preferred embodiment of ways 1 to 4 is provided if the gear device comprises means for selecting a desired output torque of the gear device and causing the adjusting means to adjust the inclination angle in dependence on the selected output torque.

A preferred embodiment of ways 1 to 4 is provided if the limiting means is arranged to prevent any rotation of the body about the third axis in the direction of decreasing inclination angle.

The means for applying a torque is used to apply a torque to the body about the inclination axis so as to increase the inclination angle. Preferably, the means for applying a torque allows controlling the magnitude of the torque during the operation of the gear device by means of a control unit. If this means for applying a torque, e.g., a hydraulic ram, is controlled with a proper control unit, the means for applying a torque may additionally serve as a limiting means to limit the reaction motion about the inclination axis and further to adjust the inclination angle to a desired value in accordance with a desired output motion speed/output torque and/or a desired reaction speed/reaction torque. In this direction, a preferred embodiment of ways 1 to 4 is provided if the means for applying a torque serves additionally as the limiting means.

Said means for applying a torque serves to apply a torque to the rotation shaft and thereby also to the body about a third axis in the direction of increasing inclination angle. Said means for applying a torque additionally may serve to prevent the rotation of the body about the inclination axis in a direction opposite to that of the applied torque. Said means for applying a torque may also serve to adjust the inclination angle to a desired value corresponding to a desired output motion speed/output torque and/or a desired reaction speed/reaction torque.

For applying a torque to the body about the inclination axis in the direction of increasing the inclination angle, for limiting the reaction motion in the direction of decreasing the inclination angle and for adjusting the inclination angle to a desired value corresponding to a desired output motion speed/output torque and/or a desired reaction speed/reaction torque, the operation of said means for applying a torque is controlled by a proper control unit which is supplied with input signals from sensors such as position, motion, speed, touch, torque, and force signals. Control signals generated by the control unit in response to the input signals affect the means for applying a torque to adjust the magnitude of the applied torque to the body about the inclination axis, limit the reaction motion and adjust the inclination angle to the desired value.

A preferred embodiment of ways 1 to 4 is provided if the limiting means comprise a separate abutment. Preferably, the abutment is a means which can stop a rotation of the body about the inclination axis without consumption of energy, e.g., a stop or a bolt.

A preferred embodiment of ways 1 to 4 is provided if the first axis passes through substantially the center of mass of the body and the body is oriented such that the moment of inertia of the body is substantially maximized.

A first preferred embodiment of ways 1 to 4 is provided if the first and second axes intersect. Preferably, either or both of the first and second axes pass through substantially the center of mass of the body. Decreasing the distance between the center of mass of the body and the second axis and keeping the variation of this distance as small as possible increases the output power and enhances the efficiency. When the second axis passes through the center of the mass of the body, the efficiency is the maximum considering only this distance as a parameter.

A second, alternative preferred embodiment of ways 1 to 4 is provided if the first and second axes do not intersect, in which case the inclination angle is defined as the acute angle between the first and second axes when viewed along the direction of the shortest line joining the first and second axes. An alternative way of expressing this geometric relationship is to consider a point on the first axis and to consider an imaginary line which passes through this point and which is parallel to the second axis. The inclination angle is then defined as the acute angle at which the first axis intersects this imaginary line.

A preferred embodiment of ways 1 to 4 is provided if the body is formed in a shape which provides that the change in the force field constituted on the body by the torque applied about the third axis is minimised during 360 degrees of rotation of the body about the first axis.

A preferred embodiment of ways 1 to 4 is provided if the body is substantially cylindrically symmetrical about the first axis and may comprise a cylinder. It is possible that the body comprises a hub and a web and a rim of ring. Preferably, the sum of the weight of the hub and the weight of the web is lower than the weight of the rim.

A preferred embodiment of ways 1 to 4 is provided if one or more of the following components of the gear device are made from a material having a high modulus of elasticity: the body, a shaft where the body is mounted on, an output shaft along the at least one output axis, parts of the gear device on which variable forces act. A material having a high modulus of elasticity includes any material with a modulus of elasticity above 70 GPa, preferably above 100 GPa. Using materials having high modulus of elasticity for the parts of the gear device on which variable forces (forces whose relative direction to the part varies) act enhances the transmission efficiency and therefore increases the output torque and enhances the efficiency of the gear device.

Using a material having a high modulus of elasticity for the body increases the output torque and enhances the efficiency of the gear device. Using a material having a high modulus of elasticity for the shaft where the body is mounted on increases the output torque and enhances the efficiency of the gear device. Using a material having a high modulus of elasticity for the output shaft increases the output torque and enhances the efficiency of the gear device. Using a material having a high modulus of elasticity for the other parts of the gear device on which variable forces (forces whose relative direction to the part varies) act increases the output torque and enhances the efficiency of the gear device.

The material of the body is selected such that its density or density distribution, respectively, is appropriate for providing a required output motive power of the gear device. Thus, if a high output motive power is required, a material with a high density, such as steel, may be used. However, it can be difficult, and hence expensive, to form steel into a desired shape, and so, for low output power requirements, thermoplastic materials may alternatively be used.

With the gear device, it is possible that undesirable vibrations arise from unbalanced forces within the gear device, as a result of (a) a lack of symmetry of the components of the gear device about the at least one output axis, and/or (b) a component of the reaction torque which is directed perpendicular to the at least one output axis. This problem could be solved by mounting/fixing the gear device by means of mounting means of the gear device, preferably by rigidly mounting the gear device to a fixed support. This fixed support may be one or more of the following: the ground, a floor, a wall, a ceiling, a casing, a container, another type of support, e.g., a rack, a frame, or a framework.

A preferred embodiment of ways 1 to 4 is provided if one or more counterbalance masses are mounted for rotation about the second axis. The counterbalance masses may have an effect so as to compensate at least partially for these unbalanced forces, by reducing the lack of symmetry and by giving rise to a centripetal force which balances the reaction torque.

The rotation of the body about the first axis is represented by a vector called the spin vector. The spin vector is identical to the angular velocity vector associated with the angular motion of the body about the first axis. While the body is rotated about the first axis, if a torque is applied to the body in the direction of increasing the inclination angle, the body starts to rotate about the second axis as well. This rotation of the body about the second axis is represented by a vector referred to below as the output motion vector. The output motion vector is identical to the angular velocity vector associated with the angular motion of the body about the second axis.

When a gear device is built, the angle between the vector of the torque applied to the body about the third axis (=applied torque vector) and the output motion vector may not be 90 degrees because of production tolerances. If the angle between the applied torque vector and the output motion vector is close to 90 degrees, the output power of the second axis is increased and the efficiency of the gear device is enhanced. The output power and the efficiency are maximized when this angle is 90 degrees considering only this angle as a parameter.

A preferred embodiment of ways 1 to 4 is provided if the gear device comprises adjusting means for adjusting the torque applied to the body about the third axis.

In order to reduce the complexity of a control unit of the motor, a multi-functional mechanism can be used for applying a torque in the direction of increasing the inclination angle, for limiting the reaction motion in the direction of decreasing the inclination angle and for adjusting the inclination angle to the desired value in accordance with a desired output motion speed/output torque and/or a desired reaction speed/reaction torque.

The multi-functional mechanism comprises a means for applying torque about the inclination axis and a means for mechanically limiting the rotation of the body about the inclination axis in both-directions between lower and upper limit angle values and a means for adjusting these angle values during the operation of the motor for a chosen lower limit angle value between 0 and 90 degrees (0 and 90 degrees are not included) and an upper limit angle value which is between the chosen lower limit angle value and 90 degrees.

The multi-functional mechanism preferably comprises force, torque, position, motion, speed and touch sensors.

A preferred embodiment of ways 1 to 4 is provided if the limiting means for mechanically limiting the rotation of the body about the inclination axis in both directions is at least one abutment.

A further option, which could be used either on its own or in combination with one or both of the above solutions to reduce undesirable vibrations arising from unbalanced forces, would be to provide a plurality of gear devices which may be mounted together and caused to operate at substantially the same frequency but at different respective phases. In this case, any such vibrations are minimised if the phases of the gear devices are equally spaced. Thus, for a system of four gear devices, the phases would be 0 degrees, 90 degrees, 180 degrees and 270 degrees.

The present invention thus extends to an assembly of gear devices of the aforementioned type, in combination with means for causing each of the gear devices to rotate at substantially the same rotational frequency but at different respective phase angles and means for combining the output motive power of the gear devices.

In such as case, the preferred number of gear devices is four, and the gear devices can advantageously be arranged in a 2×2 array.

When a system of more than one gear devices are used, for every pair of the gear devices, keeping the variation of the angle between output motion vectors of the gear devices as small as possible during the operation of the gear device increases the output power and enhances the efficiency.

When a system of more than one gear devices are used, for at least one pair of gear devices, the variation of the angle between the output motion vectors of the gear devices is preferably less than 5 degrees during the operation of the gear device.

When a system of more than one gear devices are used, for every pair of the gear devices, keeping the distance between the center of mass of the gear devices as small as possible during the operation of the gear devices increases the output power and enhances the efficiency.

The invention extends to a vehicle powered by the output motive power of a gear device or an assembly of gear devices as defined above, such as a road vehicle, an aircraft, or a water-borne vehicle.

The invention further extends to an electricity generator powered by the output motive power of a gear device or an assembly of gear devices as defined above.

A preferred embodiment of ways 1 to 4 is provided by a gear device, preferably motor device comprising a second axis being a rotational axis of a second rotatable support, a first axis being a rotational axis of a body which is rotatably arranged in a first rotatable support, whereby the first axis is rotatable forming an inclination angle between the first axis and the second axis, an inclination axis perpendicular to said second axis, whereby a torque is applied to the first axis about the inclination axis in the direction of increasing the inclination angle, and limiting means for limiting the rotation about the inclination axis in the direction of decreasing the inclination angle, whereby the body is rotated at an angular velocity greater than a critical angular velocity so that a decreasing inclination angle results, whereby said second axis solidly connected with the second support and/or said inclination axis is at least one output axis.

Since, due to the inertia of the body, there is a delay between the time at which the torque about the third axis is applied and the time at which the application of the torque about the third axis gives rise to a desired speed of rotation of the first axis about the at least one output axis of the gear device, it is advantageous in some circumstances to reduce this time delay by providing an additional, external torque to the body about the second axis of the gear device, so as to initiate or accelerate this rotation of the first axis about the at least one output axis of the gear device.

Therefore, a preferred embodiment of ways 5 to 12 is provided if the method further comprises providing an additional, external torque to the body about the second axis to apply an initial acceleration.

The application of an additional, external torque to the body about the at least one output axis of the gear device applies an initial acceleration to the body about the at least one output axis of the gear device. This can be achieved, for example, by physically rotating an output shaft of the gear device, either manually or by means of an additional motor.

A preferred embodiment of ways 5 to 12 is provided if the method further comprises controlling the source of motive power in order to cause the body to rotate about the first axis at said angular velocity greater than the critical angular velocity of the body.

A preferred embodiment of ways 5 to 12 is provided if the method further comprises selecting an inclination angle greater than 10 degrees and less than 80 degrees, this inclination angle representing said selected inclination angle.

A preferred embodiment of ways 5 to 12 is provided if the method further comprises controlling the magnitude of the torque applied to the body about the third axis.

A preferred embodiment of ways 5 to 12 is provided if the method further comprises limiting the rotation of the body about the third axis such that the inclination angle of the first axis with respect to the second axis is greater than 10 degrees and less than 80 degrees.

A preferred embodiment of ways 5 to 12 is provided if the method further comprises adjusting the inclination angle. It is possible that the method further comprises generating a desired output angular velocity about one of the at least one output axis by means of adjusting the inclination angle. Thus, after selecting a desired output speed about one of the at least one output axis, i.e., selecting a desired output speed about the second axis or about the third axis, the inclination angle is adjusted in dependence on the selected output speed. It is also possible that the method further comprises generating a desired output torque about one of the at least one output axis by means of adjusting the inclination angle. Thus, after selecting a desired output torque about one of the at least one output axis, i.e., selecting a desired output torque about the second axis or about the third axis, the inclination angle is adjusted in dependence on the selected output torque.

A preferred embodiment of ways 5 to 12 is provided if the method further comprises adjusting the speed of the body about the first axis. It is possible that the method further comprises generating a desired output angular velocity about one of the at least one output axis by means of adjusting the angular velocity of the body about the first axis. Thus, after selecting a desired output speed about one of the at least one output axis, i.e., selecting a desired output speed about the second axis or about the third axis, the speed of the body about the first axis is adjusted in dependence on the selected output speed. It is also possible that the method further comprises generating a desired output torque about one of the at least one output axis by means of adjusting the angular velocity of the body about the first axis. Thus, after selecting a desired output torque about one of the at least one output axis, i.e., selecting a desired output torque about the second axis or about the third axis, the speed of the body about the first axis is adjusted in dependence on the selected output torque.

A preferred embodiment of ways 5 to 12 is provided if the method further comprises adjusting the torque applied to the body about the third axis. It is possible that the method further comprises generating a desired output angular velocity about one of the at least one output axis by means of adjusting the torque applied to the body about the third axis. Thus, after selecting a desired output speed about one of the at least one output axis, i.e., selecting a desired output speed about the second axis or about the third axis, the torque applied to the body about the third axis is adjusted in dependence on the selected output speed. It is also possible that the method further comprises generating a desired output torque about one of the at least one output axis by means of adjusting the torque applied to the body about the third axis. Thus, after selecting a desired output torque about one of the at least one output axis, i.e., selecting a desired output torque about the second axis or about the third axis, the torque applied to the body about the third axis is adjusted in dependence on the selected output torque.

A preferred embodiment of ways 5 to 12 is provided if limiting the rotation of the body about the third axis further comprises preventing a rotation of the body about the third axis in the direction of decreasing inclination angle.

A preferred embodiment of ways 5 to 12 is provided if the method further comprises using some of the provided rotational power to perform rotating the body about the first axis at the stable operating state. In this case, the amount power so used is preferably sufficient to overcome the energy losses arising from friction due to the rotation of the body about the first axis.

Increasing the rigidity of the frame increases the output power and enhances the efficiency. A frame plane is defined as a plane that passes through any three non-linear points on the frame. For all possible frame plane pairs, keeping the variation of the angle between the normal vector of the first plane and the normal vector of the second plane as small as possible during the operation of the gear device increases the output power and enhances the efficiency considering only this angle as a parameter. Thus, a preferred embodiment of ways 5 to 12 is provided if the method further comprises keeping the variation of an angle between a normal vector of a first frame plane and a normal vector of a second frame plane less than 5 degrees.

Reducing the oscillation of the output shaft relative to the frame during the operation of the gear device increases the output power and enhances the efficiency. For all possible frame planes, keeping the variation of the angle between the output motion vector and the normal vector of the frame plane as small as possible during the operation of the gear device increases the output power and enhances the efficiency. For all possible frame planes, if the angle between the output motion vector and the normal vector of the frame plane does not change during the operation of the gear device, the efficiency is the maximum considering only this angle as a parameter. Therefore, a preferred embodiment of ways 5 to 12 is provided if the method further comprises keeping the variation of an angle between a vector of the output angular velocity about the at least one output axis and a normal vector of a frame plane less than 5 degrees.

A preferred embodiment of ways 5 to 12 is provided if the method further comprises keeping the variation of an angle between the angular velocity vector of the angular motion of the body about the first axis and a normal vector of a body plane less than 5 degrees.

For the method of providing rotation according to the invention, it is important to consider an angular velocity called "critical output speed" about the second axis. The importance of the critical output speed about the second axis is understood when a load is connected to the output shaft along the second axis. If the resistance of the load connected to the output shaft along the second axis causes the speed of the output motion about the second axis to decrease below the critical output speed about the second axis, the reaction torque will cease and the efficiency of the motor deteriorates. The critical output speed about the second axis can be compared to the idle speed of an automobile engine.

The "critical output speed" about the second axis can be determined as follows:
1. Spin the body about the first axis at an angular velocity greater than the critical angular velocity so that the reaction motion exists.
2. Brake the rotation of the body about the second axis until the reaction motion stops. The speed about the second axis at the point where the reaction motion stops is called the critical output speed about the second axis.

The critical output speed about the second axis varies with the spin speed, i.e., the angular velocity of the body about the first axis, the magnitude of the applied torque, and the inclination angle. Other influencing parameters include the structure of the system and environmental conditions.

The transmission efficiency also depends on the bending of the body relative to the first axis during the operation of the gear device. A body plane is defined as a plane which passes through any three non-linear points on the body. For all possible body planes, keeping the variation of the angle between the spin vector and the normal vector of the body plane as small as possible during the operation increases the output power and enhances the efficiency. For all possible body planes, if the angle between the spin vector and the normal vector of the body plane does not change during the operation of the gear device, the efficiency is the maximum considering only this angle as a parameter.

A preferred embodiment of ways 5 to 12 is provided if the method further comprises the following step: adjusting a torque applied to the body about the second axis so that a constant or a decreasing inclination angle is reached. In other words, the magnitude of the torque applied about the second axis, e.g., by means of a load applied to an output shaft along the second axis, is chosen so that a constant or a decreasing inclination angle is reached, i.e., so that the magnitude of the reaction torque is equal to or greater than the magnitude of the torque applied to the body about the third axis.

Reducing the frictional resistances of the gear device enhances the efficiency. For instance, using magnetic bearings and/or using lubricating means such as oil or grease for lubricating bearings and/or placing the gear device in a vacuum vessel reduce the frictional resistances.

Since the power provided by the gear device is the product of the output torque and the output motion speed or the product of the reaction torque and the reaction speed, it follows that, in order to maximize this power, it will be necessary to select a spin speed about the first axis, a magnitude of the applied torque about the third axis and an inclination angle for which the product of the output torque and the output motion speed or the product of the reaction torque and the reaction speed is maximized.

A preferred embodiment of ways 1 to 4 is provided if gear device further comprises means for adjusting the spin speed, means for adjusting the applied torque and means for adjusting the inclination angle. In this case, means may be provided for selecting a desired output motion speed and/or desired output torque of the gear device and adjusting the spin speed, the applied torque and the inclination angle accordingly. Also means may be provided for selecting a desired reaction speed and/or desired reaction torque of the gear device and adjusting the spin speed, the applied torque and the inclination angle accordingly.

A preferred embodiment of way 13 is provided if the body can be coupled with a separate rotational motor and de-coupled from the separate rotational motor.

A preferred embodiment of way 13 is provided if the test device comprises coupling means for providing the coupling between the body and the separate rotational motor whereby the coupling means is formed as a plug-in coupling.

A preferred embodiment of way 13 is provided if the body is driven by the separate rotational motor temporarily, preferably initially.

A preferred embodiment of way 13 is provided if the test device comprises one or more measuring means for measuring one or more of the following parameters: an angular velocity of the body about the spin axis, a direction of rotation of the body about the spin axis, an angular velocity of the output shaft, a direction of rotation of the output shaft, an angular velocity about the inclination axis, a direction of rotation about the inclination axis, a course of time of one or more of the preceding parameters.

A preferred embodiment of way 13 is provided if the body can be exchanged for variation of one or more of the following parameters of the body: mass, geometry, modulus of elasticity, moment of inertia, density distribution.

A preferred embodiment of way 13 is provided if the position of the body along the spin axis is variable.

A preferred embodiment of way 13 is provided if the position of the body with regard to the formation of the lever arm is variable.

A preferred embodiment of way 13 is provided if the test device comprises limiting means for limiting the motion of the spin axis about the inclination axis at a final inclination angle.

A preferred embodiment of way 13 is provided if the test device comprises a force measuring means for measuring a force exerted by the supporting means of the body at the final inclination angle.

A preferred embodiment of way 13 is provided if the limiting means comprise a stop arranged on the output shaft or the supporting means of the body and co-operating with the output shaft and/or the supporting means of the body.

A preferred embodiment of way 13 is provided if the test device comprises means for applying a torque about the inclination axis whereby the applied torque is independent of the mass of the body.

The term "cradle" according to the ways 13 and 14 is meant to denote any kind of supporting devices for support of the body, such as gimbals.

A preferred embodiment of way 14 is provided if the method further comprises determining the angular velocity of the body about the spin axis where no rotation of the spin axis about the inclination axis is observed, the determined angular velocity being the critical angular velocity.

A preferred embodiment of way 14 is provided if the method further comprises determining the critical angular velocity of a body for different values of one or more of the following parameters: the lever arm, the initial inclination angle of the spin axis.

A preferred embodiment of way 14 is provided if the method further comprises determining the ratio of the angular velocity of the body about the spin axis to the angular velocity of the output shaft dependent on various parameters, particularly dependent on an initial or final inclination angle.

These as well as further features and advantages of the invention will be better appreciated by reading the following detailed description of presently preferred exemplary embodiments taken in conjunction with accompanying drawings of which:

Figure 1:
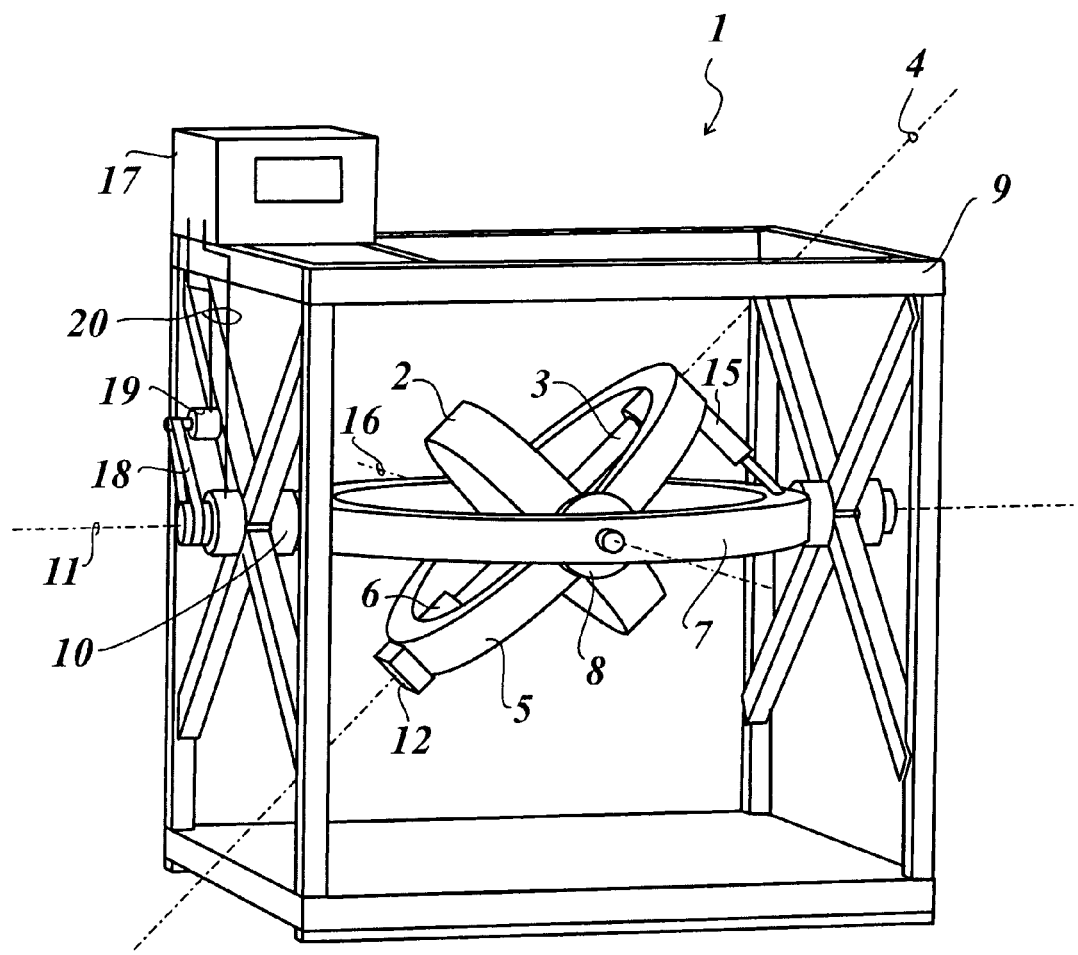
FIG. 1 illustrates a schematic view of a gear device in accordance with a preferred embodiment of the present invention.

Referring to FIG. 1, a gear device 1 comprises a body 2 in the form of a solid cylindrical wheel which is mounted co-axially on a rotation shaft 3 for rotation therewith about a first axis 4. The rotation shaft 3 is mounted within an inner cradle 5 by means of inner bearings 6. The inner cradle 5 is mounted within an outer cradle 7 for limited rotation of the inner cradle 5 about an inclination axis 16 by means of outer bearings 8, and the second cradle 7, in turn, is mounted within a frame 9 via frame bearings 10 such that it can rotate relatively to the frame 9 about a second axis 11 constituting an output axis of the gear device 1. Additionally or alternatively to the second axis 11, the inclination axis 16 constitutes an output axis of the gear device 1.

The rotation shaft 3 of the wheel 2 is caused to rotate about the first axis 4 by means of an electric motor 12 or any other source of input motive power. The electric motor 12 may be powered by a battery. The rotation shaft 3 is mounted at an inclination angle 8 relative to the second axis 11 of the gear device 1 whereby the inclination angle θ is greater than 0 degrees and less than 90 degrees.

Figure 2:
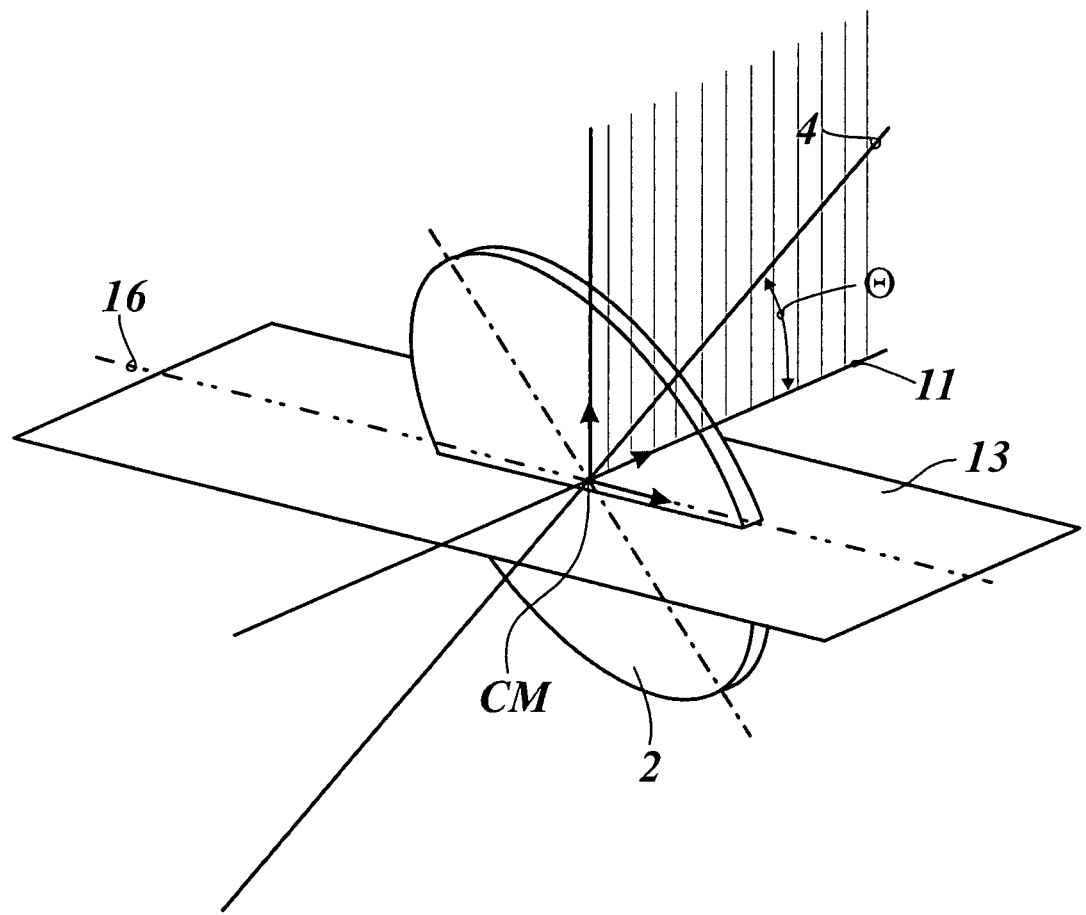
FIG. 2 is a diagram illustrating the relative orientation of the axes of rotation of components of the gear device of FIG. 1.

This can be seen more clearly in FIG. 2. The rotational axis of the wheel 2 is along the first axis 4. The wheel 2 is mounted such that the first axis 4 and the second axis 11 intersect at the center of mass CM of the wheel 2. A plane 13 spanned by the second axis 11 and the inclination axis 16 is indicated in FIG. 2 to illustrate more clearly the location of the wheel 2 in space, and three vectors along the directions of a three dimensional Cartesian co-ordinate system are shown purely to illustrate the relative orientation of the axes 4, 11, 16.

In the gear device 1 shown in FIG. 1, a hydraulic ram 15 serves to apply a torque to the rotation shaft 3—and thereby also to the wheel 2—about a third axis 16, defined as the inclination axis, which is perpendicular both to the first axis 4 and the second axis 11. The torque applied by the ram 15 is directed in the direction of increasing inclination angle θ.

The applied torque gives rise to a rotation of the first axis 4 about the second axis 11 of the gear device 1.

The hydraulic ram 15 serves additionally to prevent the first axis 4 from rotating about the inclination axis 16 in the direction opposite to that of the applied torque, i.e., so that the inclination angle θ decreases.

In operation of the gear device 1, the wheel 2 is first caused to rotate about the first axis 4 until it exceeds a predetermined critical rotational speed $\omega_c$. The hydraulic ram 15 is then actuated so as to apply a torque to the wheel 2 indirectly via the inner bearings 6 and the rotation shaft 3 about the inclination axis 16 and in the direction of increasing inclination angle θ. This gives rise to a rotation of the first axis 4 about the output axis 11. However, by virtue of the rotation of the wheel 2 above the critical rotational speed $\omega_c$ about the first axis 4, a reaction torque is generated which has a component also about the inclination axis 16 but in the opposite direction, i.e. in the direction of decreasing inclination angle θ. This reaction torque causes the first axis 4 to rotate about the inclination axis 16 in the direction so as to decrease the inclination angle θ. However, this movement is subsequently prevented by the hydraulic ram 15 which acts as an abutment stopping the rotation of the rotation shaft 3. As a result, the rotational speed $\omega_{spin}$ of the wheel 2, the rotational speed of the rotation shaft 3, the rotational speed of the first cradle 5 and the rotational speed $\omega_{out}$ of the second cradle 7 about the second axis 11, being an output axis, is increased. At this stage, a load may be applied to this output axis of the gear device 1.

The operation of the hydraulic ram 15 is controlled by a control unit 17 which is supplied with position signals from a sensor (not shown) which is mounted on the hydraulic ram 15. Control signals generated by the control unit 17 in response to the position signals affect the hydraulic pressure in the hydraulic ram 15 so as to cause the inner cradle 5 to rotate relative to the outer cradle 7 to the desired inclination angle 6.

The control unit 17 provides control signals for controlling the speed of rotation of the wheel 2, the inclination angle 6 and the magnitude of the applied torque. As indicated above, the inclination angle 6 is controlled by virtue of the hydraulic ram 15. By controlling these parameters, it is possible to control the output rotation speed $\omega_{out}$ of the gear device 1.

A feedback mechanism in the form of a belt 18, an alternator 19, an electrical harness 20 and the control unit 17 can be used to supply a portion of the output motive power supplied at the second axis 11 back to the electric motor 12.

Figure 3:
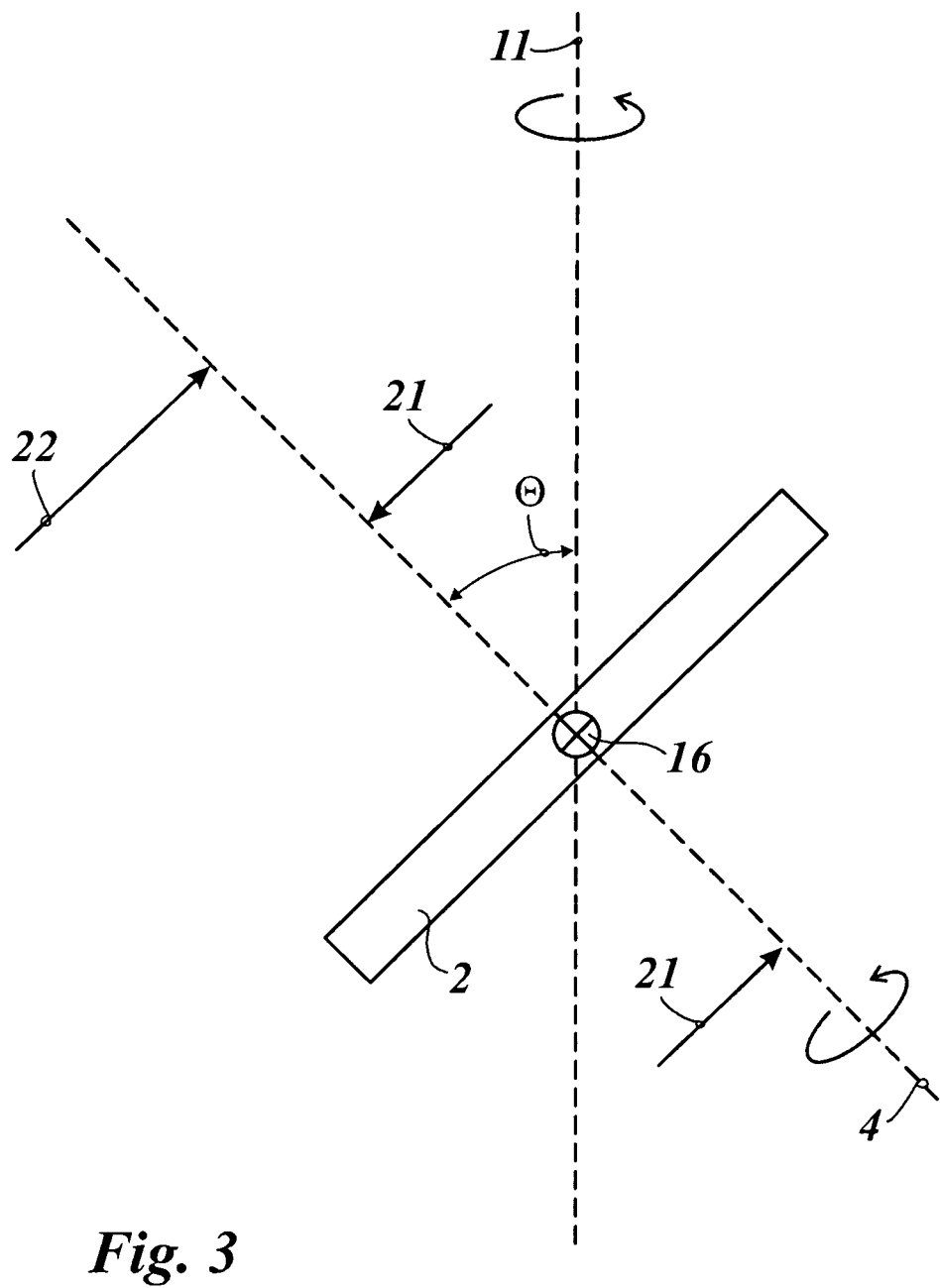
FIG. 3 is a diagram illustrating the direction in which torque is applied to provide the output motive power of the gear device of FIG. 1.

The orientation of the inclination axis 16 about which the torque is applied and the direction of the torque are illustrated in FIG. 3, in which it can be seen that the wheel 2 rotates about the first axis 4 which is at an inclination angle θ with respect to the second (=output) axis 11. The torque applied by the hydraulic ram 15 is applied in the direction indicated by the arrows 21, and the reaction torque arises in the direction indicated by the arrow 22.

Although in the preferred embodiment the first axis 4 and the second axis 11 intersect at the center of mass CM of the wheel 2, alternative arrangements are envisaged in which the first axis 4 and the second axis 11 do not intersect, in which case either the first axis 4 or the second axis 11, or neither of the first and second axes 4 and 11 may pass through the center of mass CM of the wheel 2.

It will be appreciated that, although the gear device 1 of the preferred embodiment is illustrated with its output axis 11 horizontal, the gear device 1 would function with its output axis 11 in any desired orientation.

In order to determine and estimate, respectively, parameters for the design and the operation of a gear device as described in the preceding description in combination with the FIGS. 1 to 3, a test device has been developed. The design of this test device and its operational function is described in the schematic drawing of FIG. 4.

The essential feature of this scheme is that a torque is applied to the inclination axis 16 by means of the eccentrically mounted body 2, e.g., a solid cylindrical wheel, with mass m, and that no external device for applying a torque, such as the ram 15 as shown in FIG. 1, is required. The scheme shown in FIG. 4 constitutes a modification and simplification compared to the scheme of the gear device shown in FIG. 3 because an external device for applying a torque is not required. Another significant feature of the scheme shown in FIG. 4 is limiting means for limiting the rotation of the spin axis 4 about the inclination axis 16.

Figure 5:
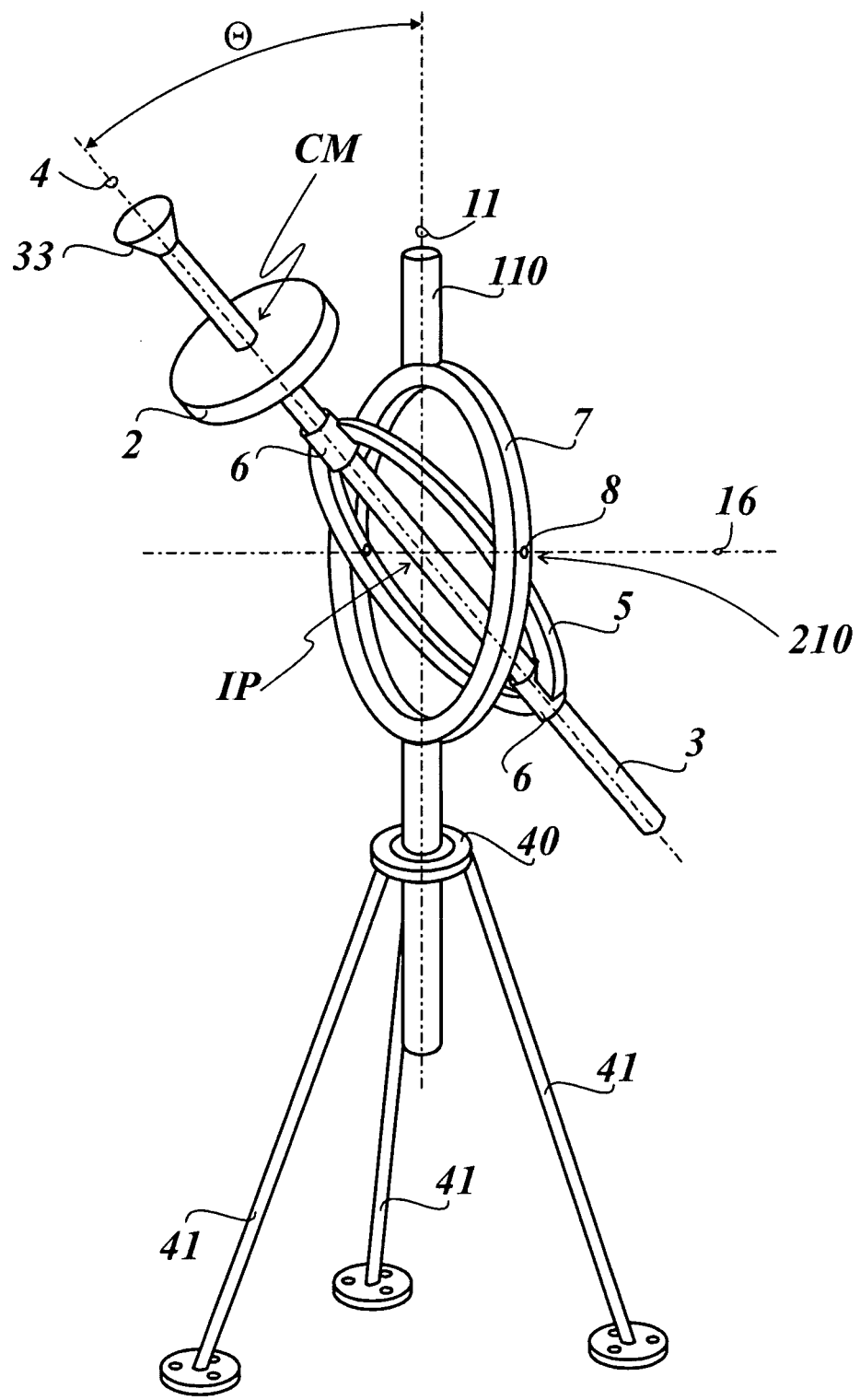
FIG. 5 shows an embodiment of a test apparatus.
Figure 6:
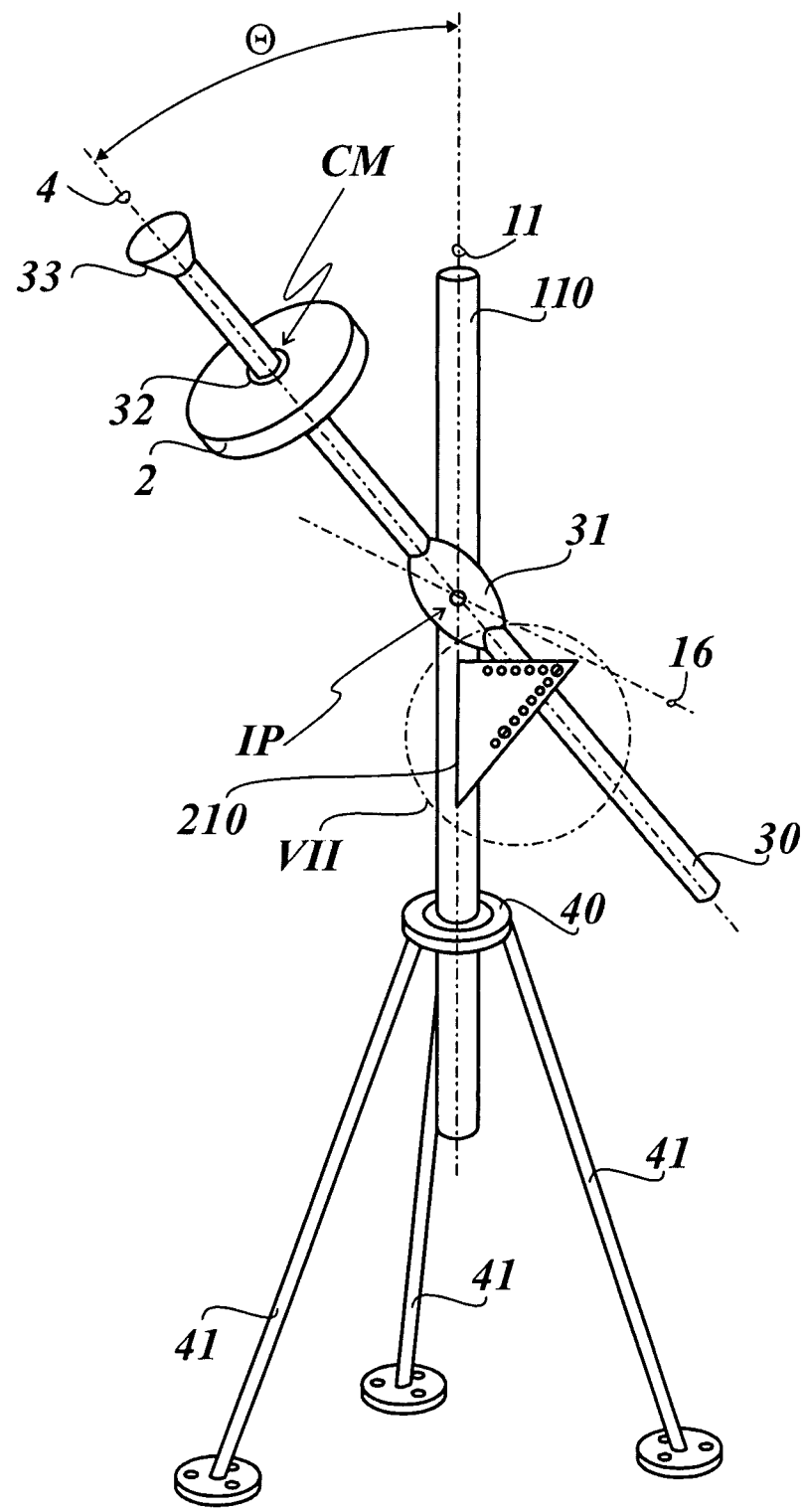
FIG. 6 shows another embodiment of a test apparatus.

The test device can be designed in different embodiments. Two different embodiments of the test device are shown in FIGS. 5 and 6 which are described in detail in the following.

It is the objective of the test device to provide a possibility for a variation of parameters while measuring other parameters. For this purpose, the concrete embodiments of the test device have special devices, e.g., coupling devices enabling the use of different rotational bodies, adjusting devices for the adjustment of a lever arm, adjustable limiting means, and various measuring units for measurement of parameters such as rotational velocities and rotational directions of the diverse rotational axes.

Figure 4:
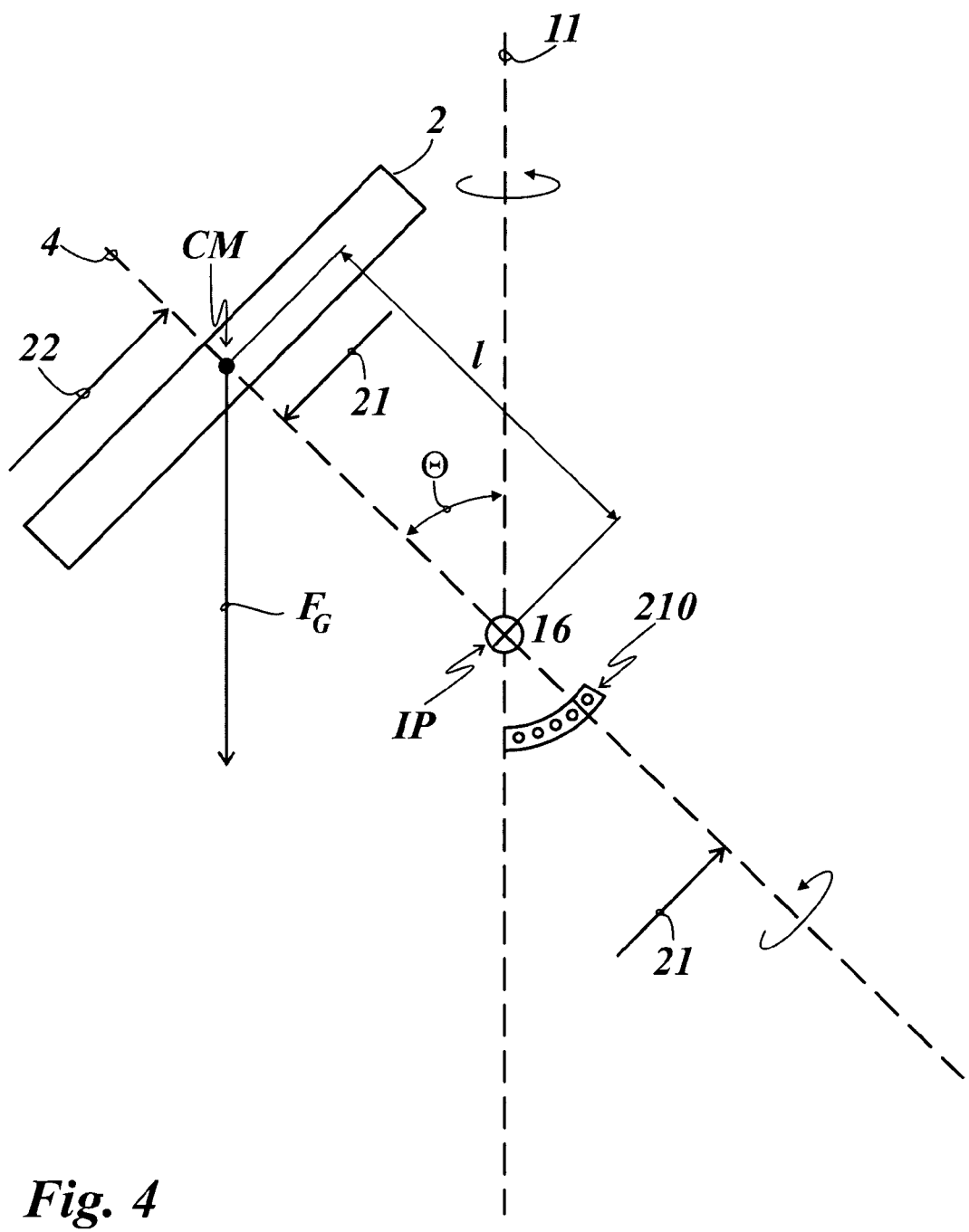
FIG. 4 shows a scheme of an alternative application of torque.

FIG. 4 illustrates in a schematic manner a situation where the mass m of the body 2 is used to apply a torque about the inclination axis 16. The body 2 rotates about the first axis 4 constituting a spin axis. The spin axis 4 is at an inclination angle θ with respect to the vertical second axis 11 constituting the output axis. The spin axis 4 can rotate about the inclination axis 16 which is perpendicular both to the spin axis 4 and the vertical output axis 11. Also, the spin axis 4 can rotate about the output axis 11. Thus, the body 2 can rotate about three different axes, namely about the spin axis 4, about the vertical output axis 11, and about the horizontal inclination axis 16.

The body 2 is mounted on the first axis 4 apart from an intersection point IP where the first axis 4, the output axis 11, and the inclination axis 16 intersect. The center of mass CM of the body 2 is at a distance l from the inclination axis 16, thus constituting a lever arm of the length l. The body 2 is subject to gravity, causing a gravitational force $$F_G = mg \qquad (eq.\ 1)$$

acting on the center of mass CM of the body 2, where g is the acceleration of gravity with an average magnitude of 9.81 m/s². The force $F_G$ applied to the body 2 exerts a torque T about the inclination axis 16. The magnitude of the torque T is $$T = F_G l \sin θ = mgl \sin θ \qquad (eq.\ 2).$$

The torque T is applied in the direction indicated by the arrows 21. If the body 2 rotates about the first axis 4 with an angular velocity $\omega_{spin}$ greater than a critical angular velocity $\omega_c$, a reaction torque arises in the direction indicated by the arrow 22. As the magnitude of the reaction torque is greater than the magnitude of the torque T arising from the weight of the body, the reaction torque causes the inclination angle θ to decrease. If the body 2 rotates about the first axis 4 with an angular velocity $\omega_{spin}$ in smaller than a critical angular velocity $\omega_c$, the magnitude of the reaction torque is smaller than the magnitude of the torque T arising from the weight of the body, and the inclination angle θ increases.

The rotation of the body 2 about the spin axis 4, the output axis 11, and the inclination axis 16 has been measured and recorded in experiments which will be documented by means of measurement values in the following. It is assumed that the rotation of the spin axis 4 about the output axis 11 is related to a precession effect well-known in the theory of rigid bodies.

Test Apparatus of FIG. 5

FIG. 5 shows an embodiment of a test apparatus which works according to the scheme shown in FIG. 4.

The essential difference of the test apparatus of FIG. 5 compared to the embodiment of the gear device shown in FIG. 1 is that the body 2 of the test apparatus shown in FIG. 5 is eccentrically mounted constituting a lever arm of a length l. The term "eccentric" here means that the center of mass CM of the body 2 is not located at the intersection point IP as is the case with the body shown in FIGS. 1 to 3. Therefore, the body 2 is subject to gravity, i.e., the body 2 with mass m applies a torque about the inclination axis 16.

The test apparatus comprises a body 2, e.g., a solid cylinder wheel, which is mounted co-axially on a rotation shaft 3 for rotation therewith. The longitudinal axis of the rotation shaft 3 is arranged along the spin axis 4. The rotation shaft 3 is rotatably mounted within an inner gimbal 5 by means of inner bearings 6. The inner gimbal 5 is mounted within an outer gimbal 7 for rotation about the inclination axis 16 by means of outer bearings 8. The second gimbal 7 is mounted on an output shaft 110 whose longitudinal axis is arranged along the vertical output axis 11.

The vertical output shaft 110 is supported by a bearing 40 so that the output shaft 110 is rotatable about its longitudinal axis. The bearing 40 is attached to a support 41, e.g., a tripod, for keeping the output shaft 110 along the vertical output axis 11. The support is mounted to the ground, e.g., by means of screws.

The spin axis 4 is at an inclination angle θ with respect to the output axis 11. The body 2 is mounted on the first axis 4 apart from the intersection point IP of the spin axis 4, the output axis 11, and the inclination axis 16. The center of mass CM of the body 2 is at a distance l from the inclination axis 3. The body 2 is subject to gravity, causing a gravitational force $F_G$=m g acting on the center of mass CM of the body 2, where m is the mass of the body 2 and g is the acceleration of gravity with an average magnitude of 9.81 m/s². The force $F_G$ applied to the body 2 exerts a torque T around the inclination axis 16. The magnitude of the torque T is T=$F_G$ l sin θ=m g l sin θ.

The rotation shaft 3 comprises coupling means 33 for easy coupling to an external source of motive power. The external source of motive power, e.g., a brace or a drill, is used for spinning the body 2 to an angular velocity $\omega_{spin}$ about the spin axis 4. However, it is also possible to provide the angular velocity $\omega_{spin}$ of the body 2 by means of any other source of input motive power, e.g., by an electric motor which is fixedly arranged on the body 2 or the rotation shaft 3.

The test apparatus further comprises limiting means 210 for limiting the admissible range of the inclination angle θ. The limiting means 210 (not shown in detail in FIG. 5) may be integrated into the outer bearings 8. The limiting means 210 limit the pivoting movement of the rotation shaft 3 to a pivot range between a minimum inclination angle $\theta_{min}$ and a maximum inclination angle $\theta_{max}$.

The body 2 is caused to rotate at an angular velocity $\omega_{spin}$. The angular velocity of the body 2 in combination with the torque exerted by the body 2 about the inclination axis 16 causes a rotation of the output shaft 110.

For the body 2 exists a critical angular velocity $\omega_c$ which is dependent on the inclination angle 6. It is the aim to determine the critical angular velocity $\omega_c$ of the body 2. For an inclination angle θ between 0° and 90°, the critical angular velocity $\omega_c$ can be determined as follows. Let us assume that the body 2 rotates with an angular velocity $\omega_{spin}$ about the spin axis 4. If the angular velocity $\omega_{spin}$ results in a rotation of the rotation shaft 3 about the inclination axis 16 in the direction of increasing the inclination angle θ, i.e., in FIG. 5 downwards, the angular velocity $\omega_{spin}$ of the body 2 is lower than the critical angular velocity $\omega_c$. If the angular velocity $\omega_{spin}$ results in a rotation of the rotation shaft 3 about the inclination axis 16 in the direction of decreasing the inclination angle θ, i.e., in FIG. 5 upwards, the angular velocity $\omega_{spin}$ of the body 2 is greater than the critical angular velocity $\omega_c$. If the angular velocity $\omega_{spin}$ does not result in a rotation of the rotation shaft 3 about the inclination axis 16, the angular velocity $\omega_{spin}$ of the body 2 is equal to the critical angular velocity $\omega_c$.

The determination of the critical angular velocity $\omega_c$ can be summarised in the following programme:

Step 1: A value $\omega_{spin}$ of the angular velocity of the body 2 about the spin axis 4 is chosen.

Step 2: If the angular velocity $\omega_{spin}$ results in a rotation about the inclination axis 16 in the direction of increasing the inclination angle θ, go to step 3;

If the angular velocity $\omega_{spin}$ results in a rotation about the inclination axis 16 in the direction of decreasing the inclination angle θ, go to step 4;

If the angular velocity $\omega_{spin}$ does not result in a rotation about the inclination axis 16, the critical angular velocity $\omega_c$ of the body 2 is determined: $\omega_c=\omega_{spin}$.

Step 3: Increase the value of $\omega_{spin}$ and go to step 2.

Step 4: Decrease the value of $\omega_{spin}$ and go to step 2.

The critical angular velocity we is dependent on the geometry and mass of the body 2, on the density distribution of the material of the body, on the inclination angle 8 between the spin axis 4 and the output axis 11, on the distance t, i.e., the magnitude of the torque, and on certain environmental conditions such as ambient temperature and humidity.

An advantage of the test apparatus of FIG. 5 is that the body 2 can be easily positioned in either of two different ways. In a first way, the body 2 can be eccentrically mounted on the rotation shaft 3, as shown in FIG. 5, so that the center of mass CM of the body 2 is at a distance l from the interception point IP. In this situation, the mass m of the body 2 applies a torque T of magnitude T=m g l sin θ about the inclination axis 16. In an alternative way, the body 2 can be mounted on the rotation shaft 3 so that the center of mass CM of the body 2 is at the interception point IP, which corresponds to the extreme case l=0. In this situation, the mass m of the body 2 applies no torque about the inclination axis 16. In this alternative case, in order to apply a torque about the inclination axis 16, it is necessary to provide an external torque-applying means, e.g., a ram which applies a constant torque over the entire range of inclination angles.

Test Apparatus of FIG. 6

FIG. 6 shows another embodiment of a test apparatus which works according to the scheme shown in FIG. 4.

The test apparatus of FIG. 6 is similar to the test apparatus of FIG. 5, except for the gimbals 5 and 7. Instead of the gimbals 5 and 7, the test apparatus of FIG. 6 comprises an output shaft 110 and a pivot arm 30. The pivot arm 30 is pivot-mounted on the output shaft 110 by means of a pivot 31 so that the pivot arm 30 is rotatable around the inclination axis 16. The pivot arm 30 is elongated downwards beyond the pivot 31 in order to enable the pivot arm 30 to co-operate with the limiting means 210. Concerning the mass of the pivot arm 30, the center of mass of the pivot arm 30 is positioned with respect to the pivot 31 so that no torque is exerted on the pivot arm 30 alone.

The pivot arm 30 comprises a bearing 32 whereby the body 2 is rotatable about the spin axis 4 which constitutes the longitudinal axis of the pivot arm 30. The position of the bearing 32 can be varied along the pivot arm for adjusting the length l of the lever arm.

Figure 7:
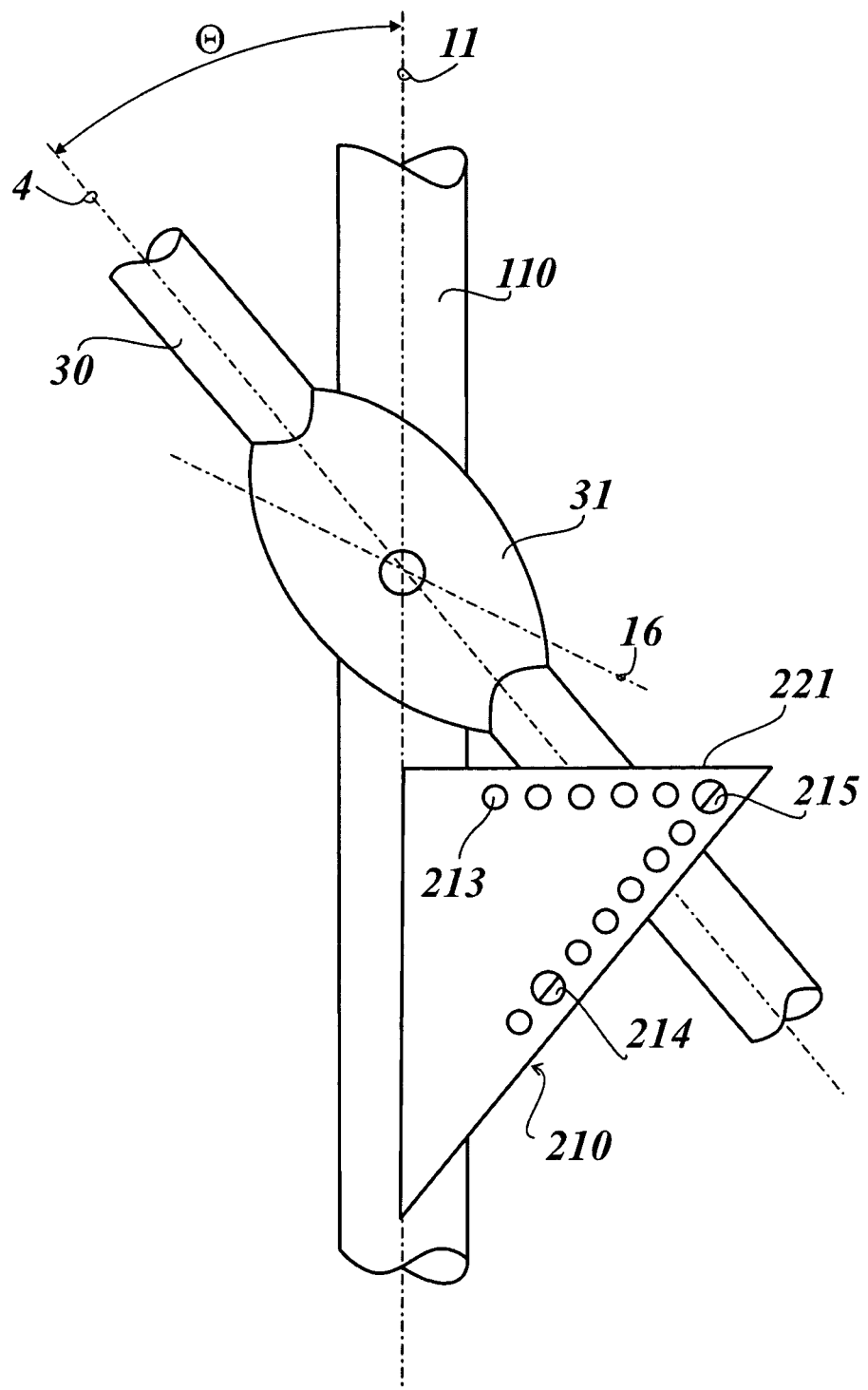
FIG. 7 shows an embodiment of limiting means, as a detail of FIG. 6.

The test apparatus further comprises limiting means 210 for limiting the admissible range of the inclination angle θ. The limiting means 210 may be steadily connected to the output shaft 110 or the pivot arm 30. The limiting means 210 limits the pivoting movement of the pivot arm 30 to a pivot range between a minimum inclination angle $\theta_{min}$ and a maximum inclination angle $\theta_{max}$. FIG. 7 shows a detailed view of the limiting means 210.

Preferably, the elements of the test apparatuses of FIGS. 5 and 6, in particular the body 2, are made from a material having a high modulus of elasticity, which is preferably above 70 GP, e.g., a rigid material such as steel or aluminium.

Limiting Means

FIG. 7 shows a first embodiment of limiting means 210 for limiting the range of the inclination angle θ. The limiting means 210 comprises a pair of parallel metal plates 221 which are fixedly arranged on the output shaft 110 below the pivot 31. The metal plates 221 are spaced apart from each other to form a vertical corridor wherein the pivot arm 30 can freely move up and down about the inclination axis 16. Each of the metal plates 221 comprises an array of holes 213. The arrays of holes of the two metal plates 221 are aligned with respect to each other so that a metal bolt 214, 215 can be horizontally slid through two aligned holes 213. A lower metal bolt 214 is inserted in a lower position, thus forming a stop for the pivot arm 30 at a minimum inclination angle $\theta_{min}$. An upper metal bolt 215 is inserted in an upper position, thus forming a stop for the pivot arm 30 at a maximum inclination angle $\theta_{max}$.

Figure 8:
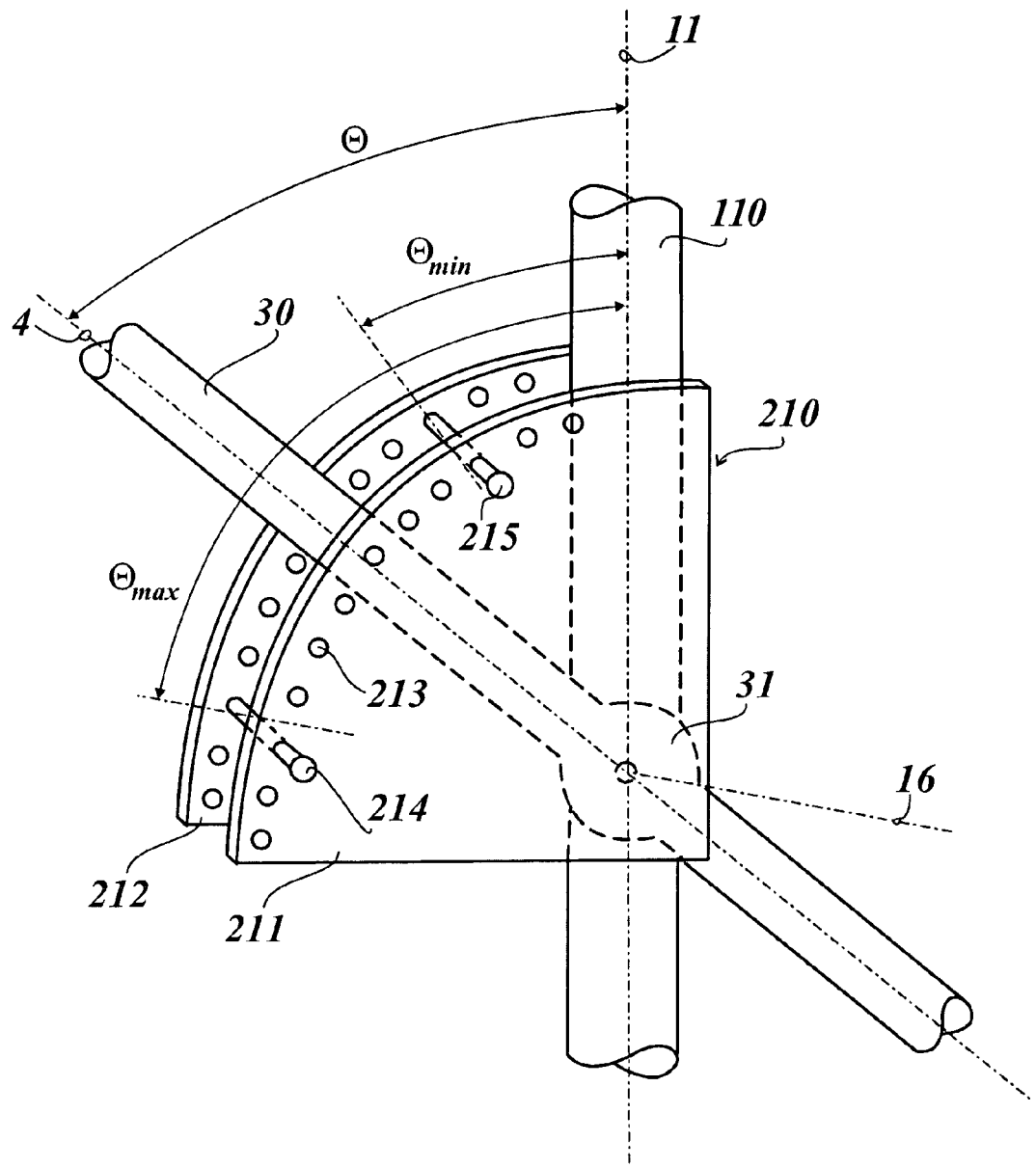
FIG. 8 shows another embodiment of limiting means.

FIG. 8 shows an alternative embodiment of the limiting means 210 for limiting the range of the inclination angle $\theta$. The function of the limiting means 210 of FIG. 8 is similar to the function of the limiting means 210 of FIG. 7, except for the position of the limiting means 210. Contrary to the pair of metal plates 221 of FIG. 7, the pair of metal plates of FIG. 8 are positioned over and above the pivot 31. A lower metal bolt 214 is inserted in a lower position, thus forming a stop for the pivot arm 30 at a maximum inclination angle $\theta_{max}$. An upper metal bolt 215 is inserted in an upper position, thus forming a stop for the pivot arm 30 at a minimum inclination angle $\theta_{min}$.

Figure 9:
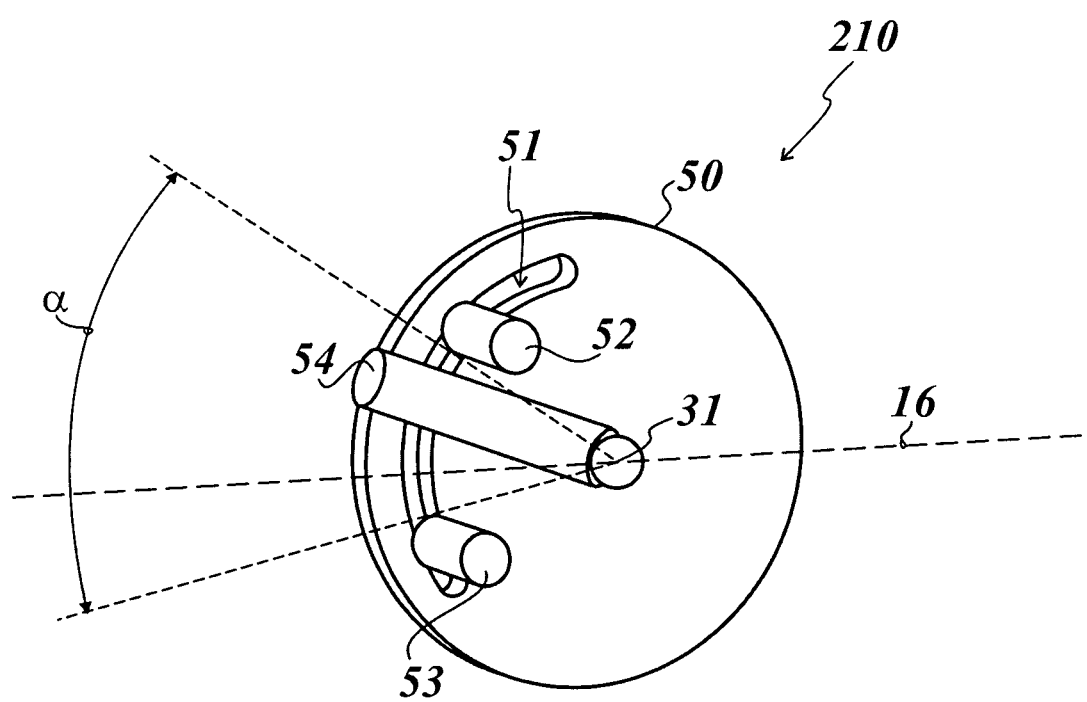
FIG. 9 shows a third embodiment of limiting means.

FIG. 9 shows still another embodiment of limiting means 210. The limiting means 210 comprise a circular metal plate 50 with a curved hole 51 in proximity to the circumference of the plate 50, a first stop 52 and a second stop 53 which project from the plate 50 and can be moved along the hole 51, and a bolt 54 movable between the first stop 52 and a second stop 53. The plate 50 is fixedly connected to the outer cradle 7 of the gear device 1 shown in FIG. 1 so that the inclination axis 16 passes through the center of the plate 50 and is perpendicular to the plane of the plate 50. A pivot 31 along the inclination axis 16 passes through the center of the plate and projects from the plate 50. One end of the bolt 54 is fixedly connected to the projecting pivot 31 so that the bolt 54 extends at ninety degrees from the inclination axis 16. The length of the bolt 54 is chosen so that a pivoting motion of the bolt 54 about the inclination axis 16 is limited by the first stop 52 and the second stop 53.

The positions of the first stop 52 and the second stop 53 can be changed individually, even during operation of the gear device 1. A change of the position of the first stop 52 or the second stop 53 can be achieved, e.g., by means of a gearing mechanism. The respective positions of the first stop 52 and the second stop 53 define a maximum angular range a the bolt 54 is allowed to pivot about the inclination axis 16. In this way, the allowable range of the inclination angle $\theta$ between the first axis 4 and the second 11 can be defined and changed, even during operation of the gear device 1.

Array

Figure 10:
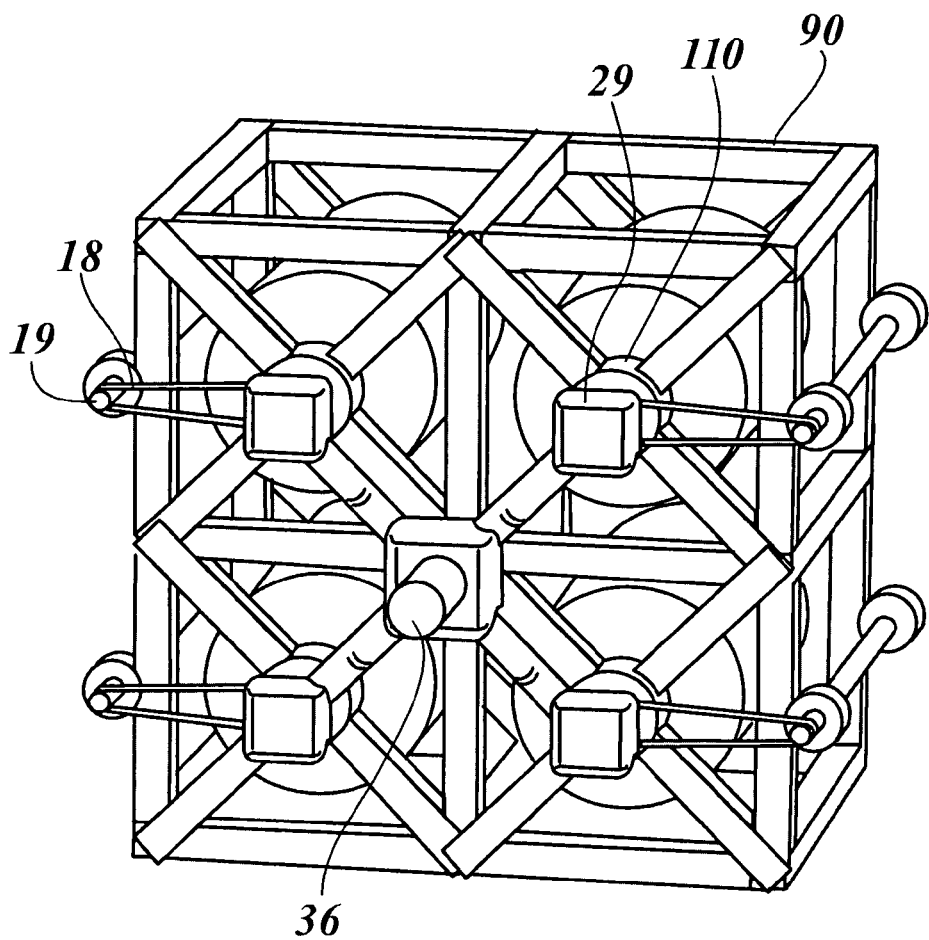
FIG. 10 shows an embodiment of an array of gear devices.

FIG. 10 shows a preferred 2×2 array of four gear devices. The 2×2 array comprises four gear devices of the type of the gear device 1 shown in FIG. 1 wherein the frames 9 of the four gear devices have been assembled into a single array frame 90. The output shafts 110 along the second axes 11 of the four gear devices project from the front side of the array frame 90. The output motive power of each of the output shafts 110 is turned around by means of four angular gears 29 for bringing the respective output motive powers of the four gear devices together into one collective output shaft 36. Each of the four gear devices comprises feedback means comprising a belt 18 and an alternator 19 for feedback of output motive power into the gear devices.

Force Field

Figure 11:
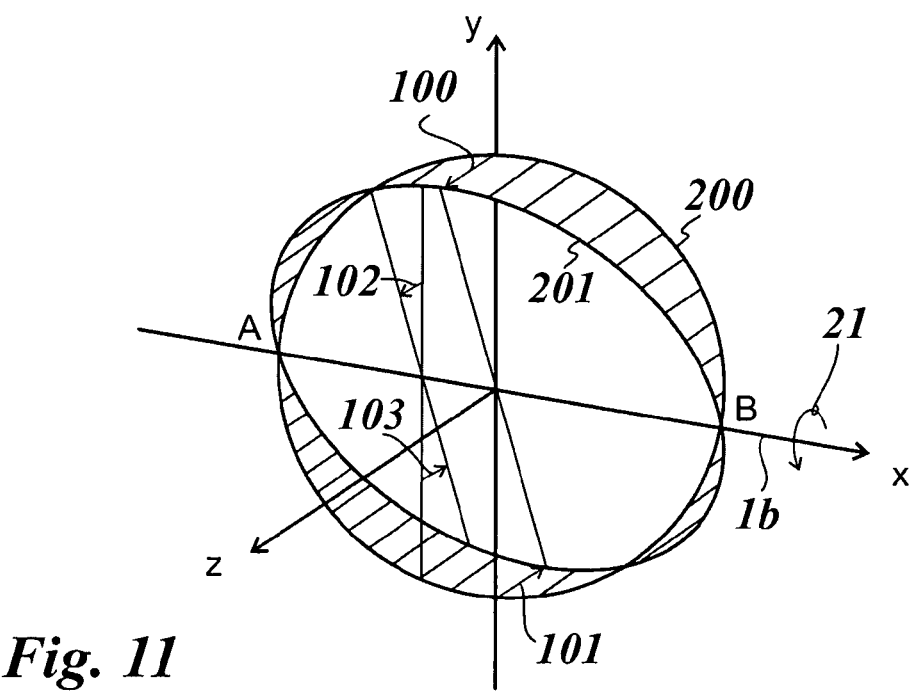
FIG. 11 shows a scheme of a force field.

FIG. 11 shows a scheme of a force field 201 acting on a cylindrical body 2 with thickness dx. FIG. 11 shows a plane 200 of the body 2 lies perpendicularly with respect to the rotational axis of the body 2. The plane FIG. 11 shows three vectors x, y, z along the directions of a three dimensional Cartesian co-ordinate system to illustrate the orientation of the plane 200 and the force field 201. A torque is applied to the body 2 about the third axis 16.

The third axis 16 runs along the x-direction direction of the Cartesian co-ordinate system and passes through the points A and B of the body plane 200. The torque vector points in the x-direction of the Cartesian co-ordinate system. The rotation direction 21 caused by the torque is determined by using the right hand rule: using the right hand, point the thumb in the direction of the torque vector. The curled fingers show the direction of rotation.

The force field 201 consists of force vectors. Four force vectors 100 to 103 of the force field 201 are exemplarily shown in FIG. 11. For the cylindrical body 2 with thickness dx, the shape of the force field, shown in FIG. 11, is the same as the force field occurring on the circular cross-section of a rod that is forced to bend. The force vectors 100 and 101 are the force vectors of the force field 201 with the maximum value. They point into the positive and the negative z-direction, respectively. The force vectors 102 and 103 are force vectors of the force field 201 with smaller value, depending on their position on the body plane 201. They point into the positive and the negative z-direction, respectively.

Vectors

Figure 12:
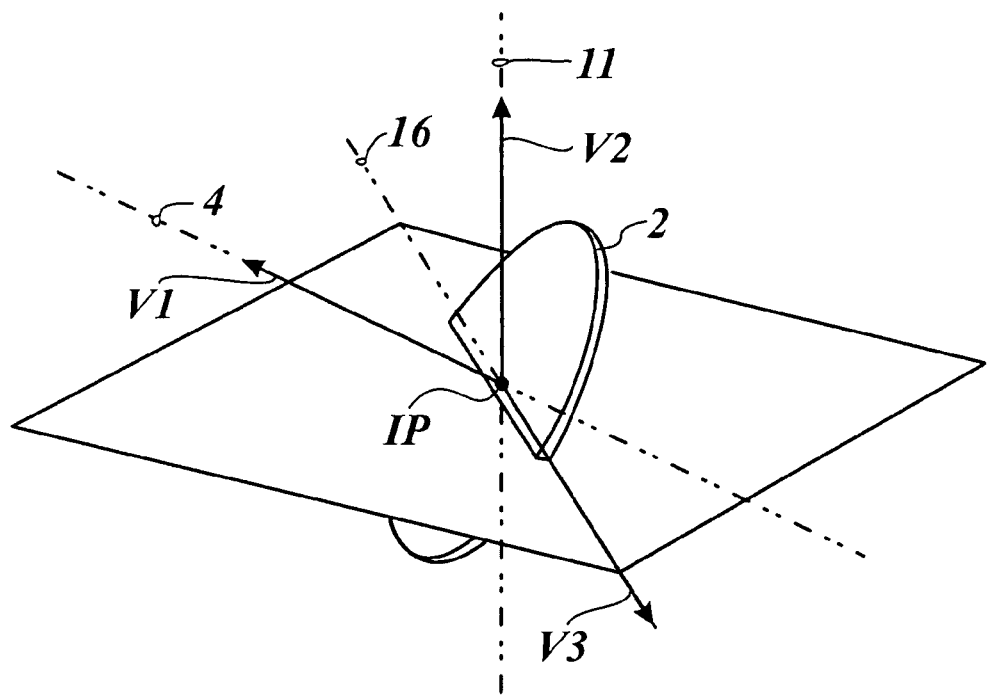
FIG. 12 shows a scheme of vectors.

FIG. 12 illustrates the orientation of vectors associated with the rotational motions occurring in a gear device according to an embodiment of the invention. FIG. 12 shows a cylindrical wheel 2 of a gear device. The center of mass of the wheel 2 is located at the intersection point IP where the first axis 4 and the second axis 11 and the third axis 16 intersect. The plane is shown purely to clarify the relative orientation of the axes 4, 11, 16 and the wheel 2.

The wheel 2 is rotated whereby the rotational axis of the wheel 2 is along the first axis 4. The angular velocity vector of the angular motion of the wheel 2 about the first axis 4 is referred to as spin vector V1.

A torque is applied to the wheel 2 about the third axis 16 (=inclination axis) in a direction of increasing the inclination angle between the first axis 4 and the second axis 11. The torque vector of the torque applied about the third axis 16 is referred to as applied torque vector V3 about the third axis.

The torque applied about the third axis 16 causes the first axis 4 to precess about the second axis 11. The angular velocity vector of the angular motion of the first axis 4 about the second axis 11 is referred to as output motion vector V2.

Connection Arm Length

Figure 13:
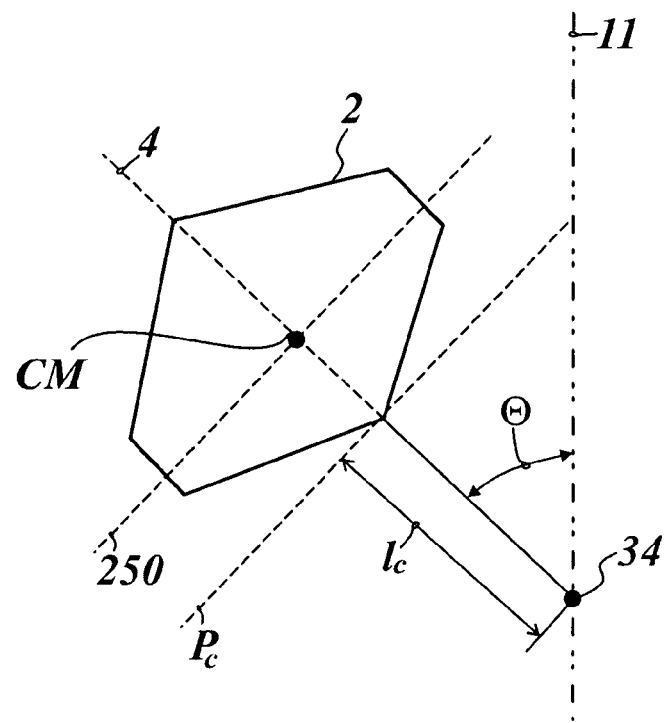
FIG. 13 shows a scheme of a connection arm length of a body.

FIG. 13 shows a scheme for illustrating the definition of the connection arm length. FIG. 13 shows the first axis 4 and the second axis 11 of a gear device according to the invention. Both axes 4, 11 lie within the drawing plane of FIG. 13. The first axis 4 is pivot-mounted on the second axis 11 by means of a pivot so that the first axis 4 is rotatable within the drawing plane of FIG. 13 about the center of pivot 34. The first axis 4 is oriented with respect to the second axis 11 at an inclination angle $\theta$. The first axis 4 constitutes the spin axis (=rotational axis) of the body 2.

FIG. 13 shows the contour of a body 2 which is mounted on the gear device for rotation about the spin axis 4 so that the spin axis 4 passes through the center of mass CM of the body 2 and the moment of inertia of the body 2 is maximized.

FIG. 13 shows a case where the body 2 is not symmetrical about the central plane 250 (=the plane which passes through the center of mass CM of the body 2 and is orthogonal to the first axis 4). In this case, among the two possible mounting orientations the one with a smaller distance between the center of mass CM of the body 2 and the third axis 16, preferably passing through the center of pivot 34, is used.

There are infinitely many planes which intersect the body 2 and are orthogonal to the spin axis 4. Among these planes the one which has the minimum distance to the center of pivot 34 is defined as the connection plane $P_c$. In accordance with the connection plane $P_c$, the length of the connection arm $l_c$ is defined as the distance of the intersection point of the connection plane $P_c$ and the spin axis 4 to the center of pivot 34. The length of the connection arm $l_c$ is different from the length of the lever arm, defined as the distance of the center of mass CM of the body 2 to the third axis 16.

Experiments

The following four experiments 1 to 4 were performed using the test apparatus shown in FIG. 6. Nine different bodies as defined in the following Table 1 were used in the experiments:

Table 1:
Parameters of the bodies A, B, C, D, E, F, G, H, and J.

TABLE 1

Parameters of the bodies A, B, C, D, E, F, G, H, and J.

| | Shape | Material | Mass [kg] | Outer Diameter [mm] | Inner Diameter [mm] | Height [mm] |
|---|---|---|---|---|---|---|
| Body A | Ring | Steel | 11.324 | 520 | 480 | 20 |
| Body B | Cylinder | Steel | 9.785 | 390 | — | 10 |
| Body C | Cylinder | Aluminium | 3.846 | 390 | — | 10 |
| Body D | Cylinder | Aluminium | 9.684 | 240 | — | 80 |
| Body E | Cylinder | Steel | 0.107 | 60 | — | 5 |
| Body F | Cylinder | Steel | 0.172 | 60 | — | 8 |
| Body G | Cylinder | Steel | 0.431 | 60 | — | 20 |
| Body H | Ring | Steel | 0.694 | 60 | 30 | 40 |
| Body J | Ring | Steel | 0.858 | 60 | 30 | 50 |

The used steel has a density of 7850 kg/m³, the used aluminium has a density of 2700 kg/m³.

Experiment 1

In this experiment we tested the four bodies A, B, C, and D as specified in Table 1 by measuring the critical angular velocities $\omega_c$ of these bodies for two different inclination angles. The experiment was performed in the test apparatus of FIG. 6. The center of mass CM of the bodies was arranged at a distance t of approximately 0.072 m from the interception point IP.

In a first run, the inclination angle θ was set to 45 degrees. The values measured are given in Table 2a.

Table 2a:
Critical angular velocities $\omega_c$ at θ=45°, measured in experiment 1 using the test apparatus of FIG. 6

TABLE 2a

Critical angular velocities $\omega_c$ at θ = 45°, measured in experiment 1 using the test apparatus of FIG. 6

| | Magnitude of Torque applied about inclination axis [Nm] | Critical angular velocity $\omega_c$ [rpm] |
|---|---|---|
| Body A | 9.14 | 99 |
| Body B | 5.58 | 381 |
| Body C | 2.20 | 192 |
| Body D | 6.48 | 410 |

The unit "rpm" means "rounds per minute", i.e., 60 rpm corresponds to 1 Hz.

In a second run, the inclination angle θ was set to 25 degrees. The values measured are given in Table 2b.

Table 2b:
Critical angular velocities $\omega_c$ at θ=25°, measured in experiment 1 using the test apparatus of FIG. 6

TABLE 2b

Critical angular velocities $\omega_c$ at θ = 25°, measured in experiment 1 using the test apparatus of FIG. 6

| | Magnitude of Torque applied about inclination axis [Nm] | Critical angular velocity $\omega_c$ [rpm] |
|---|---|---|
| Body A | 5.46 | 85 |
| Body B | 3.33 | 280 |
| Body C | 1.31 | 160 |
| Body D | 3.81 | 355 |

Experiment 2

The purpose of this experiment is to show that when the angular velocity $\omega_{spin}$ of a body is smaller than the critical angular velocity $\omega_c$, the body 2 falls, i.e., rotates about the inclination axis 16 in the same direction as the applied torque caused by the gravitational force on the mass m of the body 2.

The experiment can be summarised in the following steps:
1. The body 2 is rotated about the spin axis 4, using an external source of motive power, up to an initial angular velocity $\omega_{spin}$ which is lower than the critical angular velocity $\omega_c$ of the body for the initial inclination angle $\theta_{min}$.
2. The body 2 is located at the initial inclination angle $\theta_{min}$.
3. The body 2 is released at the initial inclination angle $\theta_{min}$.
4. The duration of the rotation of the body 2 about the inclination axis 16 starting at the initial inclination angle $\theta_{min}$ and ending at the final inclination angle $\theta_{max}$ is measured.
5. During this rotation, the maximum output angular velocity $\omega_{out}$ of the output shaft 11 is measured.

These five steps have been performed for the three bodies A, B, and C specified in Table 1. The experiment with the five aforementioned steps has been executed as follows.

The body 2 is positioned on the pivot arm 30 at a distance l=0.072 m from the inclination axis 16. The limitation means 210 are adjusted so that they limit the inclination angle θ to a range between a minimum inclination angle $\theta_{min}$=30° and a maximum inclination angle $\theta_{max}$=80°.

The pivot arm 30 is initially positioned at the inclination angle $\theta_{min}$=30° and then released. If the body 2 does not rotate, it falls under the influence of the gravitational force and the pivot arm 30 rotates around the inclination axis 16 with increasing inclination angle θ. The duration of the fall from the initial inclination angle $\theta_{min}$=30° to the final inclination angle $\theta_{max}$=80° is less than 0.5 sec.

If the body 2 is spun to an initial angular velocity $\omega_{spin}$ less than the critical angular velocity $\omega_c$ of the body 2 and released at the initial inclination angle $\theta_{min}$=30°, the pivot arm 30 precesses around the vertical output axis 11 with a slowly increasing inclination angle θ. The precession of the body 2 causes the output shaft 110 to rotate with an output angular velocity $\omega_{out}$. The helical motion of the pivot arm 30 with steadily increasing inclination angle θ continues until the pivot arm 30 touches the upper metal bolt 215 at the final inclination angle $\theta_{max}$=80°.

Table 3 gives the results of this experiment for the bodies A, B, C of Table 1.
Table 3:

TABLE 3

Fall and precession, respectively, of the pivot arm

|  | Initial angular velocity $\omega_{spin}$ [rpm] | Initial inclination angle $\theta_{min}$ [°] | Final inclination angle $\theta_{max}$ [°] | Duration of Precession (Fall) [s] | Maximum output angular velocity $\omega_{out}$ [rpm] |
|---|---|---|---|---|---|
| Bodies A, B, C | 0 | 30 | 80 | <0.5 (Fall) | 0 |
| Body A | 75 | 30 | 80 | 30 | 37 |
| Body B | 140 | 30 | 80 | 81 | 38 |
| Body C | 140 | 30 | 80 | 18 | 47 |

Experiment 3

Experiment 3 differs from experiment 2 in that the initial angular velocity $\omega_{spin}$ of the body 2 is greater than the critical angular velocity $\omega_c$ of the body 2.

The purpose of this experiment is to show that when the angular velocity $\omega_{spin}$ of a body 2 is greater than the critical angular velocity $\omega_c$, the body rises, i.e., rotates about the inclination axis 16 in the opposite direction as the applied torque caused by the gravitational force on the mass m of the body 2. This rise of the body 2 may be called "reaction motion". This experiment also demonstrates the effect of stopping the reaction motion, namely a significant increase in the output angular velocity of the output shaft 110.

The experiment can be summarised in the following steps:
1. The body 2 is rotated about the spin axis 4, using an external source of motive power, up to an initial angular velocity $\omega_{spin}$ which is greater than the critical angular velocity $\omega_c$ of the body 2 for the initial inclination angle $\theta_{max}$.
2. The body 2 is located at the initial inclination angle $\theta_{max}$.
3. The body 2 is released at the initial inclination angle $\theta_{max}$.
4. The duration of the rotation of the body 2 about the inclination axis 16 starting at the initial inclination angle $\theta_{max}$ and ending at the final inclination angle $\theta_{min}$ is measured.
5. The maximum output angular velocity $\omega_{out}$ of the output shaft 11 during the reaction motion is measured.
6. The reaction motion is stopped at the limiting angle $\theta_{min}$. The angular velocity $\omega_{spin}$ of the body 2 is measured when the body 2 has just leaned to the limiting means at the limiting angle $\theta_{min}$.
7. The maximum output angular velocity $\omega_{out}$ of the output shaft 11 when the reaction motion is stopped is measured.
8. When the angular velocity $\omega_{spin}$ of the body 2 falls below the critical angular velocity $\omega_c$ (e.g., due to frictional losses), the body 2 starts to fall.

These eight steps have been performed for the four bodies A, B, C, and D specified in Table 1. The experiment with the eight aforementioned steps has been executed as follows.

The body 2 is positioned on the pivot arm 30 at a distance l=0.072 m from the inclination axis 3. The test apparatus further comprises limitation means 210 for limiting the inclination angle θ to a range between a minimum inclination angle $\theta_{min}$=25° and a maximum inclination angle $\theta_{max}$=30°.

The pivot arm 30 is positioned at the initial inclination angle $\theta_{max}$=30°. The body 2 is spun to an initial angular velocity $\omega_{spin}$ greater than the critical angular velocity $\omega_c$ of the body 2 and the pivot arm 30 is released at the initial inclination angle $\theta_{max}$=30°. The pivot arm 30 rotates around the vertical output axis 11 with a slowly decreasing inclination angle θ. The spiraling rise of the pivot arm 30 causes the output shaft 110 to rotate with an output angular velocity $\omega_{out}$. The helical motion of the pivot arm 30 with steadily decreasing inclination angle θ continues until the pivot arm 30 touches the upper metal bolt 215 and the reaction motion is stopped at the final inclination angle $\theta_{min}$=25° (=limitation angle).

Table 4 gives the results of this experiment for the four bodies A, B, C, D of Table 1.
Table 4:
Rise of the pivot arm (=reaction motion), initial inclination angle $\theta_{max}$=30°, final inclination angle $\theta_{min}$=25°.

TABLE 4

Rise of the pivot arm (= reaction motion), initial inclination angle $\theta_{max}$ = 30°, final inclination angle $\theta_{min}$ = 25°.

| 1 | 2 Initial angular velocity $\omega_{spin}$ [rpm] | 3 Duration of Rise [s] | 4 Max. output angular velocity $\omega_{out}$ during rise [rpm] | 5 Angular velocity $\omega_{spin}$ just before stopping reaction motion [rpm] | 6 Max. output angular velocity $\omega_{out}$ after reaching $\theta_{min}$ [rpm] |
|---|---|---|---|---|---|
| Body A | 300 | 111 | 9 | 230 | 107 |
| Body A | 400 | 93 | 6 | 315 | 187 |
| Body B | 600 | 29 | 7 | 540 | 110 |
| Body C | 600 | 13 | 8 | 480 | 220 |
| Body D | 600 | 22 | 26 | 492 | 70 |

Column 2 gives the initial angular velocity $\omega_{spin}$ of the body 2 whereby the initial angular velocity $\omega_{spin}$ is higher than the critical angular velocity We for that inclination angle $\theta_{max}$=30°. Column 3 gives the time between the release of the body 2 at the initial inclination angle $\theta_{max}$=30° and the end of the rise (=reaction motion) at the final inclination angle $\theta_{min}$=25°. Column 4 gives the maximum output angular velocity $\omega_{out}$ of the output shaft 110 which is observed during the rise of the pivot arm 30. Column 5 gives the angular velocity $\omega_{spin}$ of the body 2 in the moment when the pivot arm 30 only touches the lower metal bolt 214 at the final inclination angle $\theta_{min}$=25°. Column 6 gives the maximum output angular velocity $\omega_{out}$ of the output shaft 110 which is observed after the rise of the pivot arm 30 has been stopped by the lower metal bolt 214 at the final inclination angle $\theta_{min}$=25°.

As can be seen from the columns 2, 3, and 4 of Table 4, increasing the initial angular velocity $\omega_{spin}$ increases the speed of the reaction motion, however, the maximum output angular velocity $\omega_{out}$ observed during the reaction motion decreases. When the reaction motion is stopped at the final inclination angle, the output angular velocity $\omega_{out}$ increases excessively and the amount of increase is more when the initial angular velocity $\omega_{spin}$ of the body is higher.

Experiment 4

In order to allow a comparison of different bodies with respect to their suitability in a gear device according to the invention, a specific critical angular velocity $\omega_{c,\ spec}$ is defined. The specific critical speed $\omega_{c,\ spec}$ (also referred to as "specific critical angular velocity") of a body for an inclination angle θ and a connection arm length $l_c$ is defined as the critical speed $\omega_c$ of the body measured using the test device of FIG. 6 when the inclination angle is 0 and the distance of the connection plane to the center of pivot is $l_c$.

The purpose of this experiment is to show the measurement of the specific critical speed $\omega_{c,\,spec}$ of different bodies for the length $l_c$ of the connection arm fixed at 25 mm and an inclination angle θ of 45 degrees. The experiment was performed by use of the test device of FIG. 6.

The bodies E, F, G, H, J of Table 1 with smaller diameter are used in this experiment since it is difficult to rotate bodies with higher dimensions at higher rotational speeds.

Table 5 gives the specific critical angular velocity $\omega_{c,\,spec}$ measured for the three bodies specified in Table 1.

Table 5:

Specific critical angular velocity $\omega_{c,\,spec}$ for connection arm length $l_c$=25 mm and inclination angle θ=45°.

TABLE 5

Specific critical angular velocity $\omega_{c,\,spec}$
for connection arm length $l_c$ = 25 mm
and inclination angle θ = 45°.

| | Specific critical angular velocity $\omega_{c,\,spec}$ [rpm] |
|---|---|
| Body E | 2400 |
| Body F | 2600 |
| Body G | 3200 |
| Body H | 2500 |
| Body J | 3000 |

The specific critical speed $\omega_{c,\,spec}$ of the body 2 only indicates how suitable the shape of the body 2 and the distribution of the mass of the body 2 are in terms of efficiency. Among two different bodies, the one with a lower specific critical speed $\omega_{c,\,spec}$ can be said to be more efficient in terms of shape of the body and the distribution of the mass of the body. However, the specific critical speed $\omega_{c,\,spec}$ of the body does not indicate whether the strength of the material of the body is suitable for the required output power of the gear device. The body should also be tested for strength and rigidity under the magnitude of applied torque necessary for a desired output power of the gear device. If the strength of the material of the body is not sufficient, the efficiency of the gear device may decrease during the operation of the gear device under load.

Since the specific critical speed $\omega_{c,\,spec}$ of a body 2 is a property of the body 2 that is determined dependent on the inclination angle and the length $l_c$ of the connection arm, the specific critical speed $\omega_{c,\,spec}$ of the body 2 may vary for different pairs (θ, $l_c$) of the two parameters inclination angle θ and connection arm length $l_c$. Therefore, in order to compare different bodies, the specific critical speeds $\omega_{c,\,spec}$ of the bodies for an identical (θ, $l_c$) parameter pair should be compared. Thus, it is important to use the same (θ, $l_c$) parameter pair for comparing different bodies. For the same (θ, $l_c$) parameter pair, the body with the lower specific critical speed can be said to be the more efficient body in w terms of shape of the body and the distribution of the mass of the body.

Let us assume two different bodies which have different specific critical speed values $\omega_{c,\,spec}$ for the same (θ, $l_c$) parameter pair. Then, for a certain parameter triple (=set of three) of the inclination angle θ, the magnitude of the applied torque, and the spin speed $\omega_{spin}$, the value pairs comprising the output speed value $\omega_{out}$ and the output torque value are different for these two bodies. That means, even if the inclination angle θ, the magnitude of the applied torque, and the spin speed $\omega_{spin}$ are kept the same for these two bodies, the gear device will provide different output speed values $\omega_{out}$ and output torque values for each of the two bodies.

If the size or mass of a body to be tested is not suitable for the test device, the specific critical speed of the body can be deduced by mathematical calculations from the specific critical speeds of other bodies which are scaled according to a scaling factor such that these other bodies could be tested using the test device.

One of the variables for determining the output power is the magnitude of the applied torque. In order to obtain a higher output power, it is necessary to use a higher torque as long as the other operation conditions are preserved. Also, for a selected inclination angle, if the magnitude of the applied torque is increased, the critical speed $\omega_c$ also increases. Therefore, if a torque value higher than the torque value used when determining the specific critical speed $\omega_{c,\,spec}$ is used on the same body, the new critical speed value corresponding to the new torque value would be higher than the specific critical speed $\omega_{c,\,spec}$ for that inclination angle.

Since it is mandatory that the spin speed $\omega_{spin}$ of the body should be higher than the critical speed $\omega_c$ during the operation of the gear device, a body with a higher specific critical value $\omega_{c,\,spec}$ must be rotated at higher speeds compared to a body with a lower specific critical speed $\omega_{c,\,spec}$.

Actually, using a body with a lower spin speed value $\omega_{spin}$ is beneficial because, as is known, the frictional losses (such as air friction, bearing friction) increase exponentially with the spin speed $\omega_{spin}$ (cf. Table 6). Furthermore, higher spin speeds in the gear device, preferably motor device require that the overall strength of the motor should be made higher, and this would increase the production costs of the gear device, preferably motor device.

The test device for measuring the specific critical speed $\omega_{c,\,spec}$ should have some special features in order to enhance the accuracy of the measurement: The transmission rate of the torque of the spin axis 4 to the second axis 11 caused by the frictional forces acting against the rotation about the spin axis 4 affects the specific critical speed values $\omega_{c,\,spec}$. In order to decrease this effect, the frictional forces acting against the rotation about the spin axis 4 should be as close as possible to the theoretically best value of zero. The frictional forces acting against the rotation about the second axis 11 decrease the rotational speed about the second axis 11 and hence increase the specific critical speed values $\omega_{c,\,spec}$. In order to decrease this effect, the frictional forces acting against the rotation about the second axis 11 should be as close as possible to the theoretically best value of zero.

Table 6 gives the current draw of an electric motor (=spin motor) used for spinning the body F.

Table 6:

Current draw of the electric spin motor while spinning the body F to different spin speeds $\omega_{spin}$.

TABLE 6

Current draw of the electric spin
motor while spinning the body F
to different spin speeds $\omega_{spin}$.

| Spin speed $\omega_{spin}$ [rpm] | Current draw of the spin motor [mA] |
|---|---|
| 3000 | 800 |
| 4000 | 870 |
| 5000 | 1100 |
| 6000 | 1800 |
| 7000 | 3000 |

The embodiments given in the figures have the functions which are described in the description of the figures. However, these embodiments have further functions which are not described in the description but only described in the claims.

Furthermore, the subject of all the claims can be realised in the embodiments given in the figures or modifications thereof.

KEY OF REFERENCE SIGNS 1 gear device
2 body
3 rotation shaft
4 first axis (=spin axis)
5 inner cradle
6 inner bearings
7 outer cradle
8 outer bearings
9 frame
10 frame bearings
11 second axis
12 electric motor
13 plane
15 hydraulic ram
16 third axis (=inclination axis)
17 control unit
18 belt
19 alternator
20 electric harness
21 applied torque, direction of
22 reaction torque, direction of
29 angular gear
30 pivot arm
31 pivot
32 bearing
33 coupling means
36 collective output shaft
40 bearing
41 support
50 plate
51 hole
52-53 stop
54 bolt
90 array frame
100-103 force vector
110 output shaft
200 plane
201 force field
210 limiting means
211-212 plates
213 hole
214-215 bolt
221 plates
250 central plane
CM center of mass of the body
$F_G$ gravitational force
l distance, length
$l_c$ length of connection arm
IP intersection point
$P_c$ connection plane
V1 spin vector
V2 output motion vector
V3 applied torque vector about the third axis
α angular range
θ inclination angle
$θ_{min}$ minimum inclination angle
$θ_{max}$ maximum inclination angle
ω angular velocity
$ω_c$ critical angular velocity
$ω_{c,\,spec}$ specific critical angular velocity
$ω_{out}$ angular velocity about the output axis
$ω_{spin}$ angular velocity of the body 2 about the spin axis 4

The invention claimed is:

1. A gyroscopic device
for generating rotation about an output axis, the gyroscopic device comprising:
a body mounted for rotation about first, second and third axes, the first axis being oriented with respect to the second axis at an inclination angle (θ), the second axis constituting the output axis of the gyroscopic device, wherein rotation of the body about the third axis causes a change in the inclination angle (θ);
the gyroscopic device being so structured as to enable a source of motive power to be connected to the body to cause it to rotate about the first axis at a rotational speed in excess of a predetermined value;
a means for applying a torque to the body about the third axis in a direction to increase inclination angle (θ) when the first axis is at a selected inclination angle (θ) with respect to the second axis which is greater than 0 degrees and less than 90 degrees, thereby to generate a counter-torque about the third axis in a direction to decrease inclination angle (θ);
a means for limiting rotation of the body about the third axis in a direction to decrease inclination angle (θ) which would otherwise occur as a result of the counter-torque, such that the inclination angle (θ) of the first axis with respect to the second axis remains greater than 0 degrees and less than 90 degrees; thereby to initiate, or to increase the speed of, rotation of the body about the second axis so as to generate motive power wherein the body has a specific critical angular velocity ($ω_{c,\,spec}$) of less than 20000 rounds per minute, thereby to increase an output power about the output axis, and
wherein said specific critical angular velocity ($ω_{c,\,spec}$) is defined as follows:
the specific critical angular velocity ($ω_{c,\,spec}$) is the critical angular velocity ($ω_c$) of the body
when the inclination angle (θ) of the first axis with respect to the second axis is 45 degrees,
when the first axis passes through substantially the center of mass (CM) of the body,
when the body is oriented such that the moment of inertia of the body is substantially maximized,
when, if the body is not symmetrical about a plane which passes through the center of mass (CM) of the body and which is orthogonal to the first axis, among two possible mounting orientations of mounting the body on the first axis the one with a smaller distance between the center of mass (CM) of the body and the third axis is used, and
when a connection arm length ($l_c$) is selected from the group consisting of:
a) 5 mm if the mass of the body is less than 0.1 kg,
b) 25 mm if the mass of the body is equal to or greater than 0.1 kg and less than 100 kg,
c) 50 mm if the mass of the body is equal to or greater than 100 kg and less than 1000 kg, and
d) 100 mm, otherwise,
wherein the connection arm length ($l_c$) is the distance of the intersection point of a connection plane ($P_c$) and the first axis to the third axis, and wherein among any planes which intersect the body and are orthogonal to the first axis, the plane having the minimum distance to the third axis is the connection plane ($P_c$).

2. A device as in claim 1, further comprising a source of motive power which is connected to the body to cause the body to rotate about the first axis at said angular velocity ($\omega_{spin}$) greater than said critical angular velocity ($\omega_c$).

3. A device as in claim 2, further comprising feedback means for transmitting motive power from the rotation of the body about the at least one output axis to the source of motive power.

4. A device as in claim 3, wherein the feedback means is arranged to transmit sufficient motive power to the source of motive power to overcome energy losses arising from friction due to the rotation of the body about the first axis when the inclination angle ($\theta$) and the magnitude of the applied torque about the third axis and the output angular velocity ($\omega_{out}$) about the at least one output axis are constant.

5. A device as in claim 1, further comprising a source controlling means for controlling the source of motive power to cause the body to rotate about the first axis at said angular velocity ($\omega_{spin}$) greater than said critical angular velocity ($\omega_c$).

6. A device as in claim 1, wherein the torque applying means is arranged to apply the torque to the body about the third axis when the selected inclination angle ($\theta$) is greater than 10 degrees and less than 80 degrees.

7. A device as in claim 1, further comprising a magnitude controlling means for controlling the magnitude of the torque applied by the torque applying means.

8. A device as in claim 1, wherein the limiting means is arranged so as to limit the rotation of the body about the third axis so that the inclination angle ($\theta$) of the first axis with respect to the second axis is greater than 10 degrees and less than 80 degrees.

9. A device as in claim 1, further comprising means for adjusting the inclination angle ($\theta$).

10. A device as in claim 9, further comprising an output angular velocity means for selecting a desired output angular velocity ($\omega_{out}$) about the at least one output axis and causing the adjusting means to adjust the inclination angle ($\theta$) in dependence on the selected output angular velocity ($\omega_{out}$).

11. A device as in claim 9, further comprising an output torque means for selecting a desired output torque of the said device and adjusting the inclination angle ($\theta$) in dependence on the selected output torque.

12. A device as in claim 1, wherein the torque applying means for applying a torque about the third axis comprises a spring.

13. A device as in claim 1, wherein the torque applying means for applying a torque about the third axis comprises one or more of: a hydraulic ram, a pneumatic ram, an electromagnetic ram.

14. A device as in claim 1, wherein the limiting means is arranged to prevent any rotation of the body about the third axis in the direction of decreasing inclination angle ($\theta$).

15. A device as in claim 1, wherein the means for applying a torque about the third axis serves additionally as the limiting means.

16. A device as in claim 1, wherein the limiting means comprises an abutment.

17. A device as in claim 1, wherein the first axis passes through substantially the center of mass (CM) of the body.

18. A device as in claim 1, wherein the second axis passes through substantially the center of mass (CM) of the body.

19. A device as in claim 1, wherein the first axis and the second axis intersect.

20. A device as in claim 1, wherein the first axis and the second axis do not intersect and the inclination angle ($\theta$) is defined as the acute angle between the first axis and the second axis when viewed along the direction of the shortest line joining the first axis and the second axis.

21. A device as in claim 1, wherein the body is substantially cylindrically symmetrical about the first axis.

22. A device as in claim 1, wherein the body comprises a hub and a web and a rim of ring shape.

23. A device as in claim 1, wherein the body is made from a material having a modulus of elasticity above 70 GPa.

24. A device as in claim 1, further comprising a mounting means for mounting said device.

25. A device as in claim 1, further comprising at least one counterbalance masses mounted for rotation about the second axis.

26. A device as in the preamble of claim 1, wherein an angle between a vector of the torque applied to the body about the third axis and a vector of the output angular velocity about the second axis is between 85 degrees and 93 degrees.

27. A device as in claim 1, wherein the body is mounted on a shaft which is made from a material with a modulus of elasticity above 70 GPa.

28. A device as in claim 1, wherein an output shaft along the at least one output axis is made from a material with a modulus of elasticity above 70 GPa.

29. A device as in claim 1, wherein the parts of the device, on which variable forces act are made from one or more materials with a modulus of elasticity above 70 GPa.

30. A device as in claim 1, further comprising one or more sensors for measuring values of one or more of the following parameters: a rotation about the first axis and/or the second axis and/or the third axis, an angular velocity of the rotation about the first axis and/or the second axis and/or the third axis, a position of the body and/or the first axis and/or the second axis and/or the third axis, the torque of the rotation about the first axis and/or the second axis and/or the third axis or a force.

31. A device as in the preamble of claim 1, further comprising a mechanically limiting means for mechanically limiting the rotation of the body about the inclination axis in both senses between a lower limit angle value and an upper limit angle value and an adjusting angle means for adjusting these limit angle values during the operation of said device, to a chosen lower limit angle value higher than 0 degrees and lower than 90 degrees and an upper limit angle value higher than the chosen lower limit angle value and lower than 90 degrees.

32. A device as in claim 31, wherein the mechanically limiting means for mechanically limiting the rotation of the body is at least one abutments.

33. An assembly of two or more gyroscopic devices, each of which comprises a device as in claim 2, in combination with means for causing each of said devices to rotate at substantially the same rotational speed but at different respective phase angles and means for combining the output angular velocity ($\omega_{out}$) and/or the output torque of said devices.

34. A vehicle powered by the device as in claim 2.

35. A vehicle powered by the assembly as in claim 33.

* * * * *